US011710177B2

(12) United States Patent
Obata et al.

(10) Patent No.: US 11,710,177 B2
(45) Date of Patent: Jul. 25, 2023

(54) BID-OFFER CONDITION DETERMINATION APPARATUS AND ELECTRICITY TRANSACTION SYSTEM FOR ELECTRICITY TRANSACTION BY MOBILE OBJECT

(71) Applicant: TOYOTA JIDOSHA KABUSHIKI KAISHA, Toyota (JP)

(72) Inventors: Kazuki Obata, Susono (JP); Yuki Kudo, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/407,403

(22) Filed: Aug. 20, 2021

(65) Prior Publication Data

US 2022/0122163 A1 Apr. 21, 2022

(30) Foreign Application Priority Data

Oct. 16, 2020 (JP) .................... 2020-174560

(51) Int. Cl.
*G06Q 30/08* (2012.01)
*G06Q 50/06* (2012.01)
*G06Q 30/0283* (2023.01)
*G06Q 30/0201* (2023.01)

(52) U.S. Cl.
CPC ......... *G06Q 30/08* (2013.01); *G06Q 30/0206* (2013.01); *G06Q 30/0283* (2013.01); *G06Q 50/06* (2013.01)

(58) Field of Classification Search
None
See application file for complete search history.

(56) References Cited

U.S. PATENT DOCUMENTS

| 10,304,099 B2 | 5/2019 | Basak et al. |
| 2005/0004858 A1* | 1/2005 | Foster .................... G06Q 10/06 705/36 R |

(Continued)

FOREIGN PATENT DOCUMENTS

| DE | 20 2022 106 297 U1 | 12/2022 |
| JP | 2012-196028 A | 10/2012 |

(Continued)

OTHER PUBLICATIONS

Office Action issued in U.S. Appl. No. 17/470,182 dated Feb. 13, 2023.

(Continued)

*Primary Examiner* — William J Jacob
(74) *Attorney, Agent, or Firm* — Finnegan, Henderson, Farabow, Garrett & Dunner, LLP

(57) ABSTRACT

An apparatus, for a mobile object, that determines a bid-offer condition on an electricity transaction market: determines an optimal condition making the largest gain for the mobile object from an electricity transaction, on which a contract is executed for electricity that the mobile object directly supplies to an electricity demander, based on an upper limit of an offer electricity amount of the mobile object and a predicted value of a buy price of the electricity demander for an electricity amount, the upper limit determined based on a predicted value of an electricity amount demanded by the electricity demander in each time period and an electricity amount transferable from the mobile object; and determines, as the bid-offer condition, to place an offer on an electricity transaction market at a sell price for a to-be-discharged electricity amount that are determined for each time period in the optimal condition.

9 Claims, 6 Drawing Sheets

(56) References Cited

U.S. PATENT DOCUMENTS

| | | | |
|---|---|---|---|
| 2013/0218744 A1* | 8/2013 | Chassin | G06Q 40/04 |
| | | | 705/37 |
| 2018/0204232 A1 | 7/2018 | Chambers et al. | |
| 2019/0333166 A1* | 10/2019 | Simpson | G01C 21/3484 |
| 2020/0082422 A1* | 3/2020 | Sun | H02J 3/466 |
| 2020/0160411 A1* | 5/2020 | Sun | G06N 3/0445 |
| 2020/0286188 A1* | 9/2020 | Sohn | G06Q 30/0206 |
| 2021/0019821 A1* | 1/2021 | Achar | G06N 3/0454 |
| 2023/0013447 A1 | 1/2023 | Yamauchi et al. | |

FOREIGN PATENT DOCUMENTS

| | | |
|---|---|---|
| JP | 2020-009334 A | 1/2020 |
| JP | 2020-043634 A | 3/2020 |
| JP | 2020-091529 A | 6/2020 |
| JP | 2020-178472 A | 10/2020 |
| JP | 6783190 B2 | 11/2020 |
| JP | 2021-149282 A | 9/2021 |
| KR | 2012-0000116 A | 1/2012 |
| KR | 10-2022-0138644 | 10/2022 |
| WO | WO 2022/253126 A1 | 12/2022 |

OTHER PUBLICATIONS

U.S. Appl. No. 17/470,182, filed Sep. 9, 2021.
Notice of Allowance dated May 25, 2023, issued in U.S. Appl. No. 17/470,182.

\* cited by examiner

BID-OFFER CONDITION DETERMINATION APPARATUS AND ELECTRICITY TRANSACTION SYSTEM FOR ELECTRICITY TRANSACTION BY MOBILE OBJECT

CROSS-REFERENCE TO RELATED APPLICATION

This application claims priority to Japanese Patent Application No. 2020-174560 filed on Oct. 16, 2020, incorporated herein by reference in its entirety.

BACKGROUND

1. Technical Field

The present disclosure relates to a system for transactions of selling and buying electricity (electricity transaction system) and, more specifically, to an apparatus that determines a bid-offer condition for a mobile object such as an automobile to place an offer to sell or a bid to buy electricity on a market where P2P (Peer to Peer) electricity transactions are conducted, and an electricity transaction system for allowing a mobile object to conduct an electricity transaction.

2. Description of Related Art

Liberalization of electricity has enabled transactions of selling and buying electricity on a market. Moreover, introduction of P2P (Peer to Peer) electricity transactions has been considered, in which transactions of selling and buying electricity are conducted not only by electric power companies, but also conducted directly between an individual or corporate person owning electricity resources and a demander that is a different individual or corporate person. With such trends, various technologies have been proposed for new forms of transactions of selling and buying electricity after the liberalization of electricity. For example, Japanese Patent Application Publication No. 2012-196028 proposes a system (a system that performs a "peak-cut" of electricity in an in-factory facility) that is an electricity management system for allowing electricity stored in a battery of an electric vehicle to be utilized in a facility where a large amount of electricity is in demand such as a factory, wherein the amount of electricity used from grid electricity is controlled such as not to exceed a predetermined amount of electricity by causing the battery, which is a driving source for the electric vehicle to travel and is connected to the in-factory facility, and a stationary storage battery in the in-factory facility to discharge electricity for a period when the amount of electricity consumed by an in-factory load on the in-factory facility is the largest, and by using the discharged electricity to compensate for a shortfall in the grid electricity. Japanese Patent Application Publication No. 2020-43634 proposes an electricity transaction amount optimization apparatus that can calculate electricity transaction amounts that maximize a profit from electricity transactions in an entire group including electric vehicles and demanders dotting a predetermined area, wherein a configuration is disclosed in which an electricity transaction amount to be traded by each electrically driven vehicle and each demander in the group with the other party of an electricity transaction is calculated by performing optimization calculation using an objective function to maximize the profit from the electricity transactions in the entire group, based on: a constraint condition that meets an amount of electricity demanded by each electric vehicle in an electricity transaction the electric vehicle involves in; a constraint condition that meets an amount of electricity demanded by each demander in an electricity transaction the demander involves in; and a constraint condition of an amount of tradable electricity occurring when the electric vehicles and the demanders conduct electricity transactions with the other parties of the respective electricity transactions by using electric power transmission and distribution networks in the predetermined area. As an electricity transaction platform that enables electricity to be sold by small-scale individual homes and bought by a corporation, a local government, and the like at a fair fixed price, and that enables both the electricity and an environmental value included in the electricity to be traded while establishing usage of the environmental value, Japanese Patent Application Publication No. 2020-9334 proposes a configuration in which: a general consumer and a first demander are provided with storage batteries; each of computers of demanders and the like, a person with a power generator, and the Japan Electric Power Exchange is connected to a server of an operator as equals via a P2P computer network; a smart meter, an HEMS, and a DC-AC converter are connected to each of the computers of the demanders and the like and are configured in a controllable manner; and electricity sold and bought by the demanders and the like via an electric power network is managed by a distributed ledger based on blockchain technology. As a technique of ensuring traceability of renewable energy generated electricity, Japanese Patent Application Publication No. 2020-91529 proposes an electricity transaction history generation system configured such that an operator account that records tokens issued in a blockchain, a supplier account of an electricity supplier, and a demander account of an electricity demander are managed by the blockchain, and a transaction history generation apparatus: stores, for each demander, procurement source information including a supplier that is a procurement source of electricity desired by the demander; acquires a supplied amount of electricity transmitted to a predetermined electric power network, from electricity generated by a power generation apparatus; causes a quantity of tokens corresponding to the supplied amount to be transmitted from the operator account to the supplier account; acquires a demanded amount of electricity received by the demander from the supplier via the electric power network; calculates the supplier, the demander, and a transmitted amount of electricity transmitted from the supplier to the demander, based on the supplied amount, the demanded amount, and the procurement source information; and causes a quantity of tokens corresponding to the transmitted amount to be transmitted from the corresponding supplier account to the demander account.

SUMMARY

Incidentally, with increasingly widespread use of vehicles equipped with a large-capacity storage battery, such as electric vehicles and hybrid electric vehicles (hereinafter, collectively referred to as "electrically driven vehicles"), use of electrically driven vehicles for electricity storage means has been proposed, and is being put into practice. In actuality, as in JP 2012-196028 A described above, during a period when the amount of electricity consumed by an in-factory load on the in-factory facility is the largest, a shortfall in electricity can be compensated for by instructing an electrically driven vehicle to connect the battery to an in-factory electric power line and to have the battery discharge electricity. Since an electrically driven vehicle can move to any place at the discretion of an owner, and can charge or discharge electricity there, it is useful if a general individual or corporate person can sell and buy electricity in a P2P electricity transaction as described above, by using an electrically driven vehicle.

As described above, when P2P transactions of selling and buying electricity are conducted by using mobile objects such as electrically driven vehicles in particular, conceivable market forms include a "general transaction market" and a "direct transaction market". The "general transaction market" is a market on which contracts are executed for electricity that is supplied from an electricity seller to a buyer through an electric power line of a grid-electricity network (an electric power grid for supplying electricity from a large-scale power plant operated by an electric power company), and the "direct transaction market" is a market on which contracts are executed when one of parties of an electricity transaction moves a mobile object such as an electrically driven vehicle to a place of the other party and directly transmits electricity. Regarding such forms of the electricity transaction market, it is very useful for large-scale electricity demanders that consume a large amount of electricity, such as factories, commercial facilities, rail stations, and airports, to be able to procure electricity from a direct transaction market without using an electric power line of the grid-electricity network, in terms of a reduction in electricity cost. In general, when electricity is procured through the grid-electricity network (including cases where electricity is procured on the general transaction market), a basic charge in an electricity price is determined depending on a maximum value of the amount of electricity demanded for the last one year. Accordingly, demanders attempt to reduce the maximum value of the demanded amount of electricity received from the grid-electricity network in order to reduce electricity costs. However, there are some cases where the demanded amount of electricity transiently increases. Accordingly, in such cases, some large-scale electricity demanders and the like, in particular, may take a measure called "peak-cut", in which during hours (peak hours) when an amount of electricity used per unit time width (generally, per 30 minutes) exceeds an appropriately set predetermined value, the amount of electricity received from an electric power line of the grid-electricity network is kept at or below the predetermined value by procuring as much electricity as the excess from other than the electric power line of the grid-electricity network. When such a "peak-cut" measure is conducted, the excess over the predetermined value of the amount of electricity is covered by electricity from a storage battery or an electric generator separately prepared, in general. However, since storage batteries and electric generators are expensive, and a large amount of electricity is required during peak hours and the excess over the predetermined value is accordingly great at a large-scale electricity demander or the like, a considerable introduction cost is required to introduce equipment such as storage batteries and electric generators in order to sufficiently lower a peak. On the other hand, it is advantageous if electricity contracted on a direct transaction market can be procured at a time of "peak-cut" without using the electric power line of the grid-electricity network as described above, because the introduction of equipment such as storage batteries and electric generators is unnecessary.

When an electricity demander that demands electricity in a large scale intends to enter into a contract of an electricity transaction with a mobile object such as an electrically driven vehicle through a direct transaction market in order to procure electricity for the peak-cut measure conducted at the electricity demander as described above, it is preferable to take into consideration a profit or loss, or a cost, brought to the mobile object in connection with electricity supply. For example, even if an electricity demander intends to use electricity of storage batteries of mobile objects when conducting the electricity "peak-cut" measure, not many electrically driven vehicles gather on a direct transaction market where a bid is placed by the electricity demander unless (owners of) the mobile objects can see a cost merit in discharging electricity for the electricity demander through the direct transaction market, with the result that the available amount of electricity may be limited to a total of the stored amounts of electricity remaining in electrically driven vehicles under manageable coverage of the electricity demander. In other words, in order for an electricity demander to procure electricity from other than an electric power line of the grid-electricity network through a direct transaction market when conducting the electricity "peak-cut" measure, a configuration may be built for an electricity transaction system such that an owner of a mobile object can grasp a merit in an electricity transaction according to a situation of the electricity demander on the direct transaction market, based on a notion that an electricity transaction conducted by a mobile object is part of an incentive-based economic activity in which the owner of the mobile object is given freedom of choice in deciding to discharge electricity, an amount of electricity to be discharged, and the like for the electricity demander as a destination of supply of surplus electricity of the mobile object. Thus, it is expected that an efficient transaction of selling and buying electricity can be achieved as an optimized economic activity.

Accordingly, an objective of the present disclosure is to provide a configuration that, in a P2P electricity transaction, allows a mobile object such as an electrically driven vehicle to take into consideration a cost in a transaction of selling and buying electricity and to participate in the transaction of selling and buying electricity with a more advantageous condition.

Another objective of the present disclosure is to provide a configuration that can also make a contribution to an electricity "peak-cut" at an electricity demander, while allowing a mobile object such as an electrically driven vehicle to minimize an electricity cost in a P2P electricity transaction.

Still another objective of the present disclosure is to provide a configuration that allows a mobile object such as an electrically driven vehicle to take into consideration a cost or a merit in a transaction of selling and buying electricity, according to a situation of electricity demand such as case where the electricity "peak-cut" measure is conducted by an electricity demander, and to determine whether or not to place an offer or a bid on a direct transaction market of electricity.

According to an aspect of the present disclosure, the objectives can be achieved by an apparatus, for a mobile object, that determines a bid-offer condition for a transaction of selling and buying an amount of electricity on at least one electricity transaction market, including: a bid-offer electricity amount upper limit determination section that determines an upper limit of a bid or offer amount of electricity in each of unit time periods, for a storage battery of the mobile object; an electricity amount sell-buy price prediction section that predicts sell and buy prices for an amount of electricity in each of the unit time periods on each electricity transaction market; a charge-discharge optimization section that determines, for each of the unit time periods, an electricity transaction market, a sell or buy price, and an amount of electricity to be charged into or discharged from the storage battery of the mobile object in an optimal condition, by detecting the optimal condition that makes the largest gain in terms of an index value, which represents a profit gained or a loss incurred from selling or buying of the amount of electricity by the mobile object on the electricity transaction market, within ranges of dischargeable and chargeable amounts of electricity of the storage battery of the mobile object over at least one of the unit time periods, based on the upper limits of the bid or offer amount of electricity obtained by the bid-offer electricity amount upper limit determination section, and predicted values of the sell and buy prices for the amount of electricity obtained by the electricity amount sell-buy price prediction section; and a bid-offer condition determination section that determines as the bid-offer condition on the at least one electricity transaction market, for each of the unit time periods, to place an offer or a bid on the electricity transaction market determined by the charge-discharge optimization section, at the sell or buy price for the amount of electricity to be discharged or charged determined by the charge-discharge optimization section, wherein for the at least one electricity transaction market, a direct transaction market can be selected, on which a contract is executed for an electricity transaction in which the mobile object directly supplies electricity to an electricity demander, the electricity amount sell-buy price prediction section is configured to predict a buy price for the amount of electricity in each of the unit time periods to be presented by the electricity demander on the direct transaction market, as a predicted value of the sell and buy prices for the amount of electricity, and the bid-offer electricity amount upper limit determination section includes a section that predicts an amount of electricity demanded by the electricity demander over at least one of the unit time periods, and the bid-offer electricity amount upper limit determination section is configured to determine the upper limit of the bid or offer amount of electricity in each of the unit time periods, based on a predicted value of the demanded amount of electricity and an amount of electricity transferable from the mobile object.

In the configuration, the "mobile object" may be a vehicle such as an electrically driven vehicle, such as an electric vehicle or a hybrid electric vehicle, or any other mobile object, on which an externally chargeable and dischargeable storage battery is mounted. The "electricity transaction market" here may be a market on which a transaction of selling and buying electricity can be conducted by a mobile object through a bid or an offer, and may include, as described above, a general transaction market on which a contract is executed for electricity that is supplied from an electricity seller to a buyer through an electric power line of the grid-electricity network, and a direct transaction market on which a contract is executed for a case where one of parties of an electricity transaction moves a mobile object such as an electrically driven vehicle to a place of the other party and directly transmits electricity (accordingly, in the direct transaction market, when the electricity seller is a mobile object such as an electrically driven vehicle, a contract is executed for electricity that is supplied directly from the electricity seller by the electricity seller moving the mobile object to a place of the buyer). In the apparatus according to the present disclosure, the number of electricity transaction markets that can be selected as a destination of the bid or offer of the mobile object may be one or more. For the "bid-offer condition for a transaction of selling and buying an amount of electricity", a time period in which electricity supply or procurement is conducted, an amount of electricity in each unit time period over the time period, and a sell or buy price in each unit time period for supply or procurement of the amount of electricity (in the present description, the term "price" may be a price for a unit amount of electricity or a price for an amount of electricity to be traded, unless otherwise stated) are included in the condition, and a contract for an electricity transaction is executed on a market when a bid-offer condition of an electricity seller and a bid-offer condition of an electricity buyer approximately match (the "unit time period" indicates one of time periods obtained by dividing a time duration for which electricity supply or procurement is conducted, into parts each with a predetermined time length set on an electricity transaction market; currently in Japan, since 24 hours are divided into 48 parts, the length of one unit time period is 30 minutes). The "upper limit of a bid or offer amount of electricity in each of unit time periods, for a storage battery of the mobile object" determined by the "bid-offer electricity amount upper limit determination section" is an upper limit of an amount of electricity to be discharged from the storage battery of the mobile object that is set in each unit time period, that is, an upper limit of an amount of electricity that is set when an offer is placed, and is an amount that is changed according to a condition such as a destination of electricity supply, or a condition taken into consideration when electricity supply is conducted, which will be described later. Moreover, since the upper limit is an upper limit of the amount of electricity to be discharged, the amount of electricity in each unit time period included in the bid-offer condition determined by the bid-offer condition determination section, which will be described later, is determined to be equal to or lower than such an upper limit of the bid or offer amount of electricity. The "sell and buy prices for an amount of electricity in each of the unit time periods on each electricity transaction market" are sell and buy prices for the amount of electricity offered by sellers and bid by buyers on at least one electricity transaction market, generally a plurality of electricity transaction markets that can be a destination of an offer or a bid, and the "electricity amount sell-buy price prediction section" is a section that predicts the sell and buy prices for the amount of electricity on the at least one electricity transaction market by using an arbitrary method. Specifically, for example, with use of a reference condition such as a climate condition including a time of year, a time period of day, weather, and an atmospheric temperature, predicted values of the sell and buy prices may be determined as appropriate based on records of sell and buy prices, asked values, and the like used in past electricity transactions under similar reference conditions. For the predicted values of the sell and buy prices, a different value may be predicted in each unit time period and on each electricity transaction market.

In the configuration of the apparatus, the "charge-discharge optimization section", as described above, detects an optimal condition that makes the largest gain ("makes the largest gain" is assumed to mean "makes a smallest loss" when the magnitude of a loss is greater than the magnitude of a profit in the profit or loss from a transaction) in terms of an index value, which represents a profit gained or a loss incurred by the mobile object from selling or buying of the amount of electricity on an electricity transaction market, within ranges of dischargeable and chargeable amounts of electricity of the storage battery of the mobile object over at least one unit time period, based on the "upper limits of the bid or offer amount of electricity" and the "predicted values of the sell and buy prices for the amount of electricity".

Here, the "ranges of dischargeable and chargeable amounts of electricity of the storage battery of the mobile object" is a dischargeable amount of electricity and a chargeable amount of electricity depending on a capacity and an amount of stored electricity of the storage battery of the mobile object. In other words, the range of the dischargeable amount of electricity is amounts of electricity ranging from an amount of electricity stored in the storage battery to a lower limit of SOC (State Of Charge), and the range of the chargeable amount of electricity is amounts of electricity ranging from an amount of electricity stored in the storage battery to an upper limit of SOC. The ranges of the dischargeable and chargeable amounts of electricity may be determined, with an amount of electricity required for use such as movement of the mobile object taken into consideration. "A profit gained or a loss incurred from selling or buying of the amount of electricity" is a profit gained or a loss incurred from an electricity transaction and, more specifically, may be a profit or a loss that is a quantity obtained by multiply a sell or buy amount of electricity by a sell or buy price. On the condition that one electricity transaction market is selected at a time, the charge-discharge optimization section searches for an optimal condition that makes the largest gain over at least one time period, by calculating "a profit gained or a loss incurred from selling or buying of the amount of electricity" while variously changing an amount of electricity to be sold or bought at each of the sell and buy prices predicted in each unit time period and on each electricity transaction market, and thus determines an electricity transaction market, a sell or buy price, and an amount of electricity to be discharged or charged by the storage battery of the mobile object in each time period in the optimal condition.

In the configuration of the apparatus according to the present disclosure, particularly when a direct transaction market is included in the at least one electricity transaction market, a buy price for the amount of electricity in at least one time period to be presented by an electricity demander is predicted, and an amount of electricity demanded by the electricity demander in each time period is predicted. Here, the "electricity demander" may be an individual person, a facility, or the like demanding electricity, and particularly a large-scale electricity demander is a demander that consumes a large amount of electricity, such as a factory, a commercial facility, a rail station, or an airport. The "buy price for the amount of electricity" is a buy price paid when the electricity demander buys electricity from an electricity seller. The prediction of the amount of electricity demanded by the electricity demander in each time period may be performed by using an arbitrary method. Specifically, for example, with use of a reference condition such a climate condition including a time of year, a time period of day, weather, and an atmospheric temperature, a predicted value of the demanded amount of electricity may be determined as appropriate based on past records of amounts of electricity demanded by the electricity demander under similar reference conditions. The predicted value of the amount of electricity demanded by the electricity demander in each time period is referred to, together with an amount of electricity transferable from the mobile object, by the bid-offer electricity amount upper limit determination section, and is reflected on an upper limit of the bid or offer amount of electricity in each unit time period. Note that the "amount of electricity transferable from the mobile object" is a total amount of electricity that can be used for electricity supply to the electricity demander, of the amount of electricity stored in the storage battery of the mobile object.

Hence, according to the configuration of the apparatus according to the present disclosure, when the mobile object places an offer or a bid for an electricity transaction on an electricity transaction market, the charge-discharge optimization section refers to the upper limits of the bid or offer amount of electricity and the predicted values of the sell and buy prices for the amount of electricity on each electricity transaction market, and finds a bid-offer condition that can be an optimal condition that makes the largest gain for the mobile object. Accordingly, it is expected that an incentive for the electricity transaction is given to an owner of the mobile object. At the time, particularly when electricity transaction markets that can be selected as a destination of an offer or a bid include a direct transaction market on which a contract is executed for an electricity transaction in which the mobile object directly supplies electricity to an electricity demander, a bid-offer condition on which the mobile object directly supplies electricity to an electricity demander through the direct transaction market can be more easily detected as an optimal condition by the charge-discharge optimization section when electricity demand is high at the electricity demander if a configuration is made such that the upper limits of the bid or offer amount of electricity is determined by referring to the amounts of electricity demanded by the electricity demander on the direct transaction market, and that the predicted values of the sell and buy prices for the amount of electricity include predicted values of the buy price for the amount of electricity to be presented by the electricity demander on the direct transaction market. In other words, when electricity demand is high at an electricity demander, the electricity demander attempts to procure electricity through a direct transaction market, and it is expected that as a larger amount of electricity is demanded by the electricity demander, the buy price to be bid on the direct transaction market is set higher. With such an increase in the predicted value of the amount of electricity demanded by the electricity demander, the bid-offer electricity amount upper limit determination section of the apparatus according to the present disclosure raises the upper limit of the bid or offer amount of electricity accordingly, and the predicted value of the buy price for the amount of electricity to be presented by the electricity demander is increased accordingly. Therefore, a gain in terms of an index value indicating a profit or a loss from selling or buying of the amount of electricity, made when the mobile object places an offer on a direct transaction market on which the electricity demander places a bid is comparatively higher than gains according to other bid-offer conditions. Thus, a higher incentive can be given to an owner of a mobile object for an offer placed for an electricity transaction with an electricity demander presenting higher demand, and consequently, the electricity demander presenting higher demand can procure more electricity from mobile objects.

As described above, according to the configuration of the apparatus according to the present disclosure, when a bid-offer condition used in an electricity transaction of the mobile object is optimized, a state of electricity demand at an electricity demander, including a case of conducting the "peak-cut" measure and the like, is taken into consideration, whereby when the bid-offer condition in the electricity transaction of the mobile object is determined, not only maximization of a gain made by the mobile object is achieved, but it is also expected that an increase in demand at an electricity demander can be efficiently handled.

When the apparatus according to the present disclosure determines a bid-offer condition, it is preferable that a larger amount of electricity is supplied from the mobile object when a predicted value of the amount of electricity demanded by the electricity demander is larger. Accordingly, the bid-offer electricity amount upper limit determination section of the apparatus may be configured to distribute the amount of electricity transferable from the mobile object such that one of the upper limits of the bid or offer amount of electricity in a unit time period in which a predicted value of the amount of electricity demanded by the electricity demander is larger is higher than another one of the upper limits of the bid or offer amount of electricity in a unit time period in which a predicted value of the amount of electricity demanded by the electricity demander is smaller.

Moreover, as already mentioned, there are some cases where an electricity demander attempts to procure electricity through a direct transaction market, as the "peak-cut" measure, when the amount of electricity demanded by the electricity demander exceeds an appropriately set reference value, in order to restrain the amount of electricity procured from an electric power line of the grid-electricity network. Accordingly, in a case where an electricity demander sets a reference value that is to allow the electricity demander to conduct electricity procurement through the direct transaction market for the demanded amount of electricity, the bid-offer electricity amount upper limit determination section may include a section that calculates a degree of tightness of electricity, which is an index value indicating an extent to which a predicted value of the amount of electricity demanded by the electricity demander exceeds the reference value in any one of the unit time periods, and the bid-offer electricity amount upper limit determination section may be configured to set the one of the upper limits of the bid or offer amount of electricity to be higher according to a magnitude of the extent, indicated by the degree of tightness of electricity, to which the predicted value of the demanded amount of electricity exceeds the reference value. In an embodiment, an upper limit of the bid or offer amount of electricity may be set when a predicted value of the demanded amount of electricity exceeds the reference value, or in another embodiment, an upper limit of the bid or offer amount of electricity may begin to be set when a predicted value of the demanded amount of electricity exceeds a value that is lower than the reference value by a predetermined width that can be set as appropriate. Basically, the upper limits of the bid or offer amount of electricity may be set to become higher in proportion to the extents to which the predicted values of the demanded amount of electricity exceed the reference value (amounts obtained by subtracting the reference value from each predicted value of the demanded amount of electricity), indicated by the degrees of tightness of electricity. However, when a predicted value of the demanded amount of electricity exceeds the reference value to a large extent represented by a degree of tightness of electricity, the bid-offer electricity amount upper limit determination section may be configured to set the one of the upper limits of the bid or offer amount of electricity to be higher than an amount that is proportional to the extent, indicated by the degree of tightness of electricity, to which the predicted value of the demanded amount of electricity exceeds the reference value such that supply of more electricity can be achieved.

At the bid-offer electricity amount upper limit determination section of the apparatus according to the present disclosure, the "amount of electricity transferable from the mobile object", which is a total amount of electricity that can be used for electricity supply to the electricity demander, of the amount of electricity stored in the storage battery of the mobile object, may be determined, specifically, based on: an amount of electricity obtained by subtracting an amount of electricity predicted to be consumed by the mobile object before electricity is supplied to the electricity demander from an amount of electricity stored (or to be stored from the present into the future) in the storage battery of the mobile object; a predicted value of a duration for which the mobile object is stopped at the electricity demander; and an amount of electricity per unit time period dischargeable from the storage battery of the mobile object at the electricity demander. The "predicted value of a duration for which the mobile object is stopped at the electricity demander", in particular, is a predicted value of a duration for which the mobile object can be present at a place of the electricity demander and discharge electricity in a stopped state, and may be determined as appropriate, based on a schedule of the mobile object. The "amount of electricity per unit time period dischargeable from the storage battery of the mobile object at the electricity demander" is, in short, a dischargeable capacity of a charger-discharger or a discharger when electricity is discharged from the storage battery of the mobile object at the electricity demander, and may be determined depending on a performance of the charger-discharger or the discharger provided at the electricity demander. With such a configuration, it is expected that the "amount of electricity transferable from the mobile object" can be determined with higher accuracy, and that a more adequate bid-offer condition can be determined.

By the way, in the apparatus according to the present disclosure, a predicted value of the buy price for the amount of electricity to be presented by the electricity demander on the electricity transaction market and a predicted value of the amount of electricity demanded by the electricity demander in each unit time period may be determined as appropriate as described above, as one embodiment, with use of a reference condition such as a climate condition including a time of year, a time period of day, weather, and an atmospheric temperature, and based on past data under similar reference conditions. When information can be acquired about a buy price for the amount of electricity and a demanded amount of electricity in each unit time period bid by the electricity demander on the direct transaction market, the electricity amount sell-buy price prediction section may be configured to predict each predicted value of the buy price for the amount of electricity to be presented by the electricity demander on the electricity transaction market, based on the buy price bid by the electricity demander on the electricity transaction market; and the bid-offer electricity amount upper limit determination section may be configured to predict the predicted value of the amount of electricity demanded by the electricity demander in each of the unit time periods, based on the desired buy amount of electricity bid by the electricity demander on the electricity transaction market. Each predicted value may be a value bid on the electricity transaction market, or a value obtained by correcting the bid value by using an arbitrary method. With such a configuration, accuracy of each predicted value of the buy price and each predicted value of the demanded amount of electricity are enhanced, and it is expected that a more adequate bid-offer condition can be determined.

In a sell-buy transaction for which the apparatus, for mobile object, that determines a bid-offer condition for a transaction of selling or buying an amount of electricity is used, it is also advantageous to the electricity demander side if a bid-offer condition is determined that encourages more mobile objects to place offers for electricity supply through a direct transaction market when electricity demand at an electricity demander increases. Accordingly, according to another aspect of the present disclosure, the objectives of the present disclosure can also be achieved partially by an apparatus, for an electricity demander, that determines a bid-offer condition for a transaction of selling and buying an amount of electricity on at least one electricity transaction market, including: a section that predicts an amount of electricity demanded by the electricity demander over at least one unit time period; and a bid-offer condition determination section that determines, as the bid-offer condition, to place a bid to buy an amount of electricity on a direct transaction market, on which a contract is executed for an electricity transaction in which a mobile object directly supplies electricity to the electricity demander, when a predicted value of the amount of electricity demanded by the electricity demander in each of the at least one unit time period exceeds a predetermined reference value, wherein the bid-offer condition determination section is configured to set a buy price of electricity in the bid-offer condition to be higher when a predicted value of the demanded amount of electricity exceeds the predetermined reference value, than when a predicted value of the demanded amount of electricity falls below the predetermined reference value.

In the configuration according to the above aspect of the present disclosure, the "predetermined reference value" for the predicted values of the amount of electricity demanded by the electricity demander is a reference value set such that a bid for electricity procurement is placed on a direct transaction market when the demanded amount of electricity exceeds the reference value. As mentioned already, the "predetermined reference value" may be set for the "peak-cut" measure to restrain the amount of electricity procured through an electric power line of the grid-electricity network, and may be set by the electricity demander as appropriate. According to the configuration, when a predicted value of the amount of electricity demanded by the electricity demander exceeds the predetermined reference value, the buy price of electricity in a bid-offer condition is set higher on a direct transaction market, than when a predicted value of the demanded amount of electricity falls below the predetermined reference value, and it is therefore expected that more offers for electricity supply can be gathered from mobile objects on the direct transaction market when a predicted value of the demanded amount of electricity exceeds the predetermined reference value. Thus, it is expected that the "peak-cut" measure to restrain the amount of electricity procured from an electric power line of the grid-electricity network can be more easily achieved.

Moreover, according to the bid-offer condition determination apparatus for electricity demander, the bid-offer condition determination section may include a section that predicts an amount of electricity procurable from a mobile object that is able to directly supply electricity at the electricity demander in the at least one unit time period, and the bid-offer condition determination section may be configured to set the buy price of electricity in the bid-offer condition on the direct transaction market, based on a predicted value of the amount of electricity procurable from the mobile object. When the electricity demander places a bid for electricity procurement from mobile objects on a direct transaction market when a predicted value of the demanded amount of electricity exceeds the predetermined reference value, the buy price set in a bid by the electricity demander tends to be higher if the electricity demander cannot predict at all how many mobile objects place offers for the bid, and how much electricity can be secured. However, when the electricity demander can predict what amount of electricity can be procured from mobile objects, it is expected the buy price in the bid-offer condition can be set more fairly. For example, when a predicted value of the amount of electricity procurable from mobile objects is larger, the buy price in the bid-offer condition may be set lower than when a predicted value of the amount of electricity procurable from mobile objects is smaller.

According to the bid-offer condition determination apparatus for mobile object, or further the bid-offer condition determination apparatus for electricity demander, a novel electricity transaction system that achieves the above-mentioned objectives is provided. Accordingly, according to still another aspect of the present disclosure, a system is provided that is an electricity transaction system that accepts an offer or a bid for a transaction of selling and buying electricity from a mobile object and a bid to buy electricity from an electricity demander, and executes a contract for the transaction of selling and buying electricity, wherein the system is configured to accept the bid or offer from the mobile object according to a bid-offer condition determined by the apparatus for mobile object according to any one of the configurations described above, or further to accept the bid from the electricity demander according to a bid-offer condition determined by any one of the apparatuses for electricity demander.

Communication of information between the bid-offer condition determination apparatus for mobile object, the bid-offer condition determination apparatus for electricity demander, and the electricity transaction system according to the present disclosure may be achieved through an arbitrary wireless or wired communication network. A configuration of, and processing such as computational operations at, each section in each apparatus may be implemented by operation according to a program on a computer apparatus.

According to any of the apparatuses and the system of the present disclosure, in a P2P electricity transaction, it is expected that direct electricity supply from a mobile object can be more appropriately achieved for electricity demand at an electricity demander, particularly, for electricity demand during the "peak-cut" measure, while the mobile object such as an electrically driven vehicle maximizes a gain in terms of a profit or a loss from the transaction. In the configuration according to the present disclosure, a mobile object can create a plan of bids and offers to electricity demanders after considering magnitudes of electricity demand at the electricity demanders such as business operators. For example, it is expected that a gain can be made by capturing a business opportunity of "peak-cut" at a business operator. Moreover, for example, an operation may be implemented in which electricity is stored in advance when it is predicted that the electricity "peak-cut" measure will be conducted at a large electricity demander and it is determined that electricity will be bought at a higher price. From the perspective of the electricity demander side, since an electricity peak occurs during a time period when people gather in many cases, use of stored electricity of storage batteries of mobile objects that gather together with the people brings an advantage that equipment such as stationary storage batteries or electric generators for "peak-cut" can be reduced. Trust of business operators in automobile-derived electricity can be increased by placing priority on avoidance of electric power outages at business operators rather than immediate gains, whereby business operators count on automobiles, which leads to maintenance of the quantity of transactions with business operators demanding electricity, and to a merit for automobiles.

Other objectives and advantages of the present disclosure will become clear through a following description of preferred embodiments of the present disclosure.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, some preferred embodiments of the present disclosure will be described in detail with reference to the accompanying drawings. Throughout the drawings, like signs denote like elements.

Configuration of Electricity Transmission and Distribution System

Figure 1:
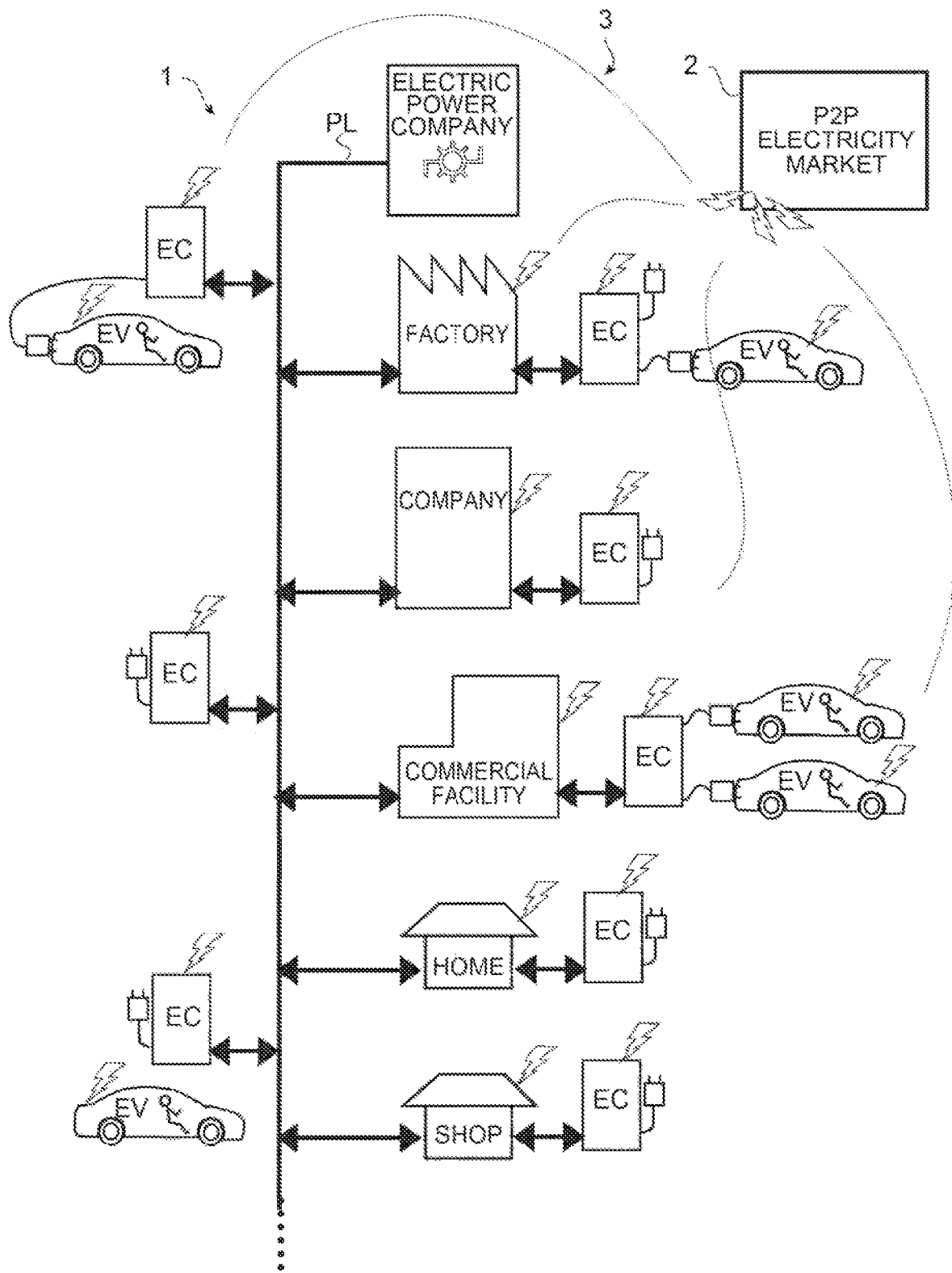
FIG. 1 schematically depicts an electricity transmission and distribution system for electricity that is traded on a P2P electricity transaction market to which an embodiment is applied.

As schematically shown in FIG. 1, in an electricity transmission and distribution system 1, as distributed power supplies have become widely available owing to the liberalization of electricity and technologies for generating electricity from renewable energy, introduction of P2P electricity selling and buying transactions, that is, introduction of transactions of selling and buying electricity between individuals has been considered and, technically, is becoming feasible, although, previously, electricity was supplied exclusively from a power plant managed by an electric power company through a power grid PL (grid-electricity network) laid up to various facilities and buildings that consume or use electricity, for example, various electricity demanders such as factories, buildings (business operators such as companies), commercial facilities, homes, and shops. Moreover, in the electricity transmission and distribution system 1, with the increasingly widespread use of mobile objects such as electrically driven vehicles EV equipped with large-capacity storage batteries, such as electric vehicles and hybrid electric vehicles, charger-discharger facilities EC are installed at various places on the power grid PL and in electricity demanders, and an electrically driven vehicle EV can connect to such a charger-discharger facility EC and charge or discharge the storage battery. Moreover, since a charger-discharger facility EC can be installed in a facility of an electricity demander, supply of electricity from an electrically driven vehicle EV to the electricity demander, or reception of electricity by an electrically driven vehicle EV from the electricity demander, can be performed via the power grid PL, or can be directly performed through the charger-discharger facility EC installed at the electricity demander. Use of an electrically driven vehicle EV for electricity storage means has been proposed and is being put into practice, and it is also considered to sell and buy electricity by using a mobile object such as an electrically driven vehicle EV through a P2P transaction.

In a system in which a P2P electricity selling and buying transaction is conducted between electricity demanders including mobile objects such as electrically driven vehicles EV, each electrically driven vehicle EV and each electricity demander is provided with a processing device (computer) including: a communication function capable of communicating information, via a communication network 3 (typically, the communication function may be capable of communication through a wireless communication network in case of a mobile object such as an electrically driven vehicle EV, and through a wired or wireless communication network in case of an electricity demander located at a fixed place such as a facility), with an information processing system (server) 2 that executes a P2P electricity selling and buying transaction; and a function of accessing a market for P2P electricity selling and buying transactions, which is configured on the system 2, and enabling a bid to buy or an offer to sell electricity to be placed. To put it simply, when any of the mobile objects such as the electrically driven vehicles EV and the electricity demanders desires a transaction to sell or buy electricity, the electrically driven vehicle EV or the electricity demander places an offer or a bid on a market where the electrically driven vehicle EV or the electricity demander desires to conduct the transaction of selling and buying electricity, according to a bid-offer condition including a time period in which the electrically driven vehicle EV or the electricity demander desires to sell or buy electricity, as well as a desired sell or buy amount of electricity and a sell or buy price in each unit time period. An operator of the market for P2P electricity selling and buying transactions issues a contract for a transaction of selling and buying electricity between a seller and a buyer that have matching bid-offer conditions, based on an arbitrary algorithm, and handles an offer or a bid for which a matching condition cannot be found as "nothing done". Note that each of the charger-discharger facilities EC at various places may be configured to transmit information on a use state of the charger-discharger facility (usability, occupied or not, an amount of electricity increased or decreased through a charge or discharge conducted, and the like) to the information processing system, whereby it is notified to each mobile object such as an electrically driven vehicle EV which charger-discharger facility EC is available.

Configuration of P2P Electricity Selling and Buying Transaction System

Figure 2A:
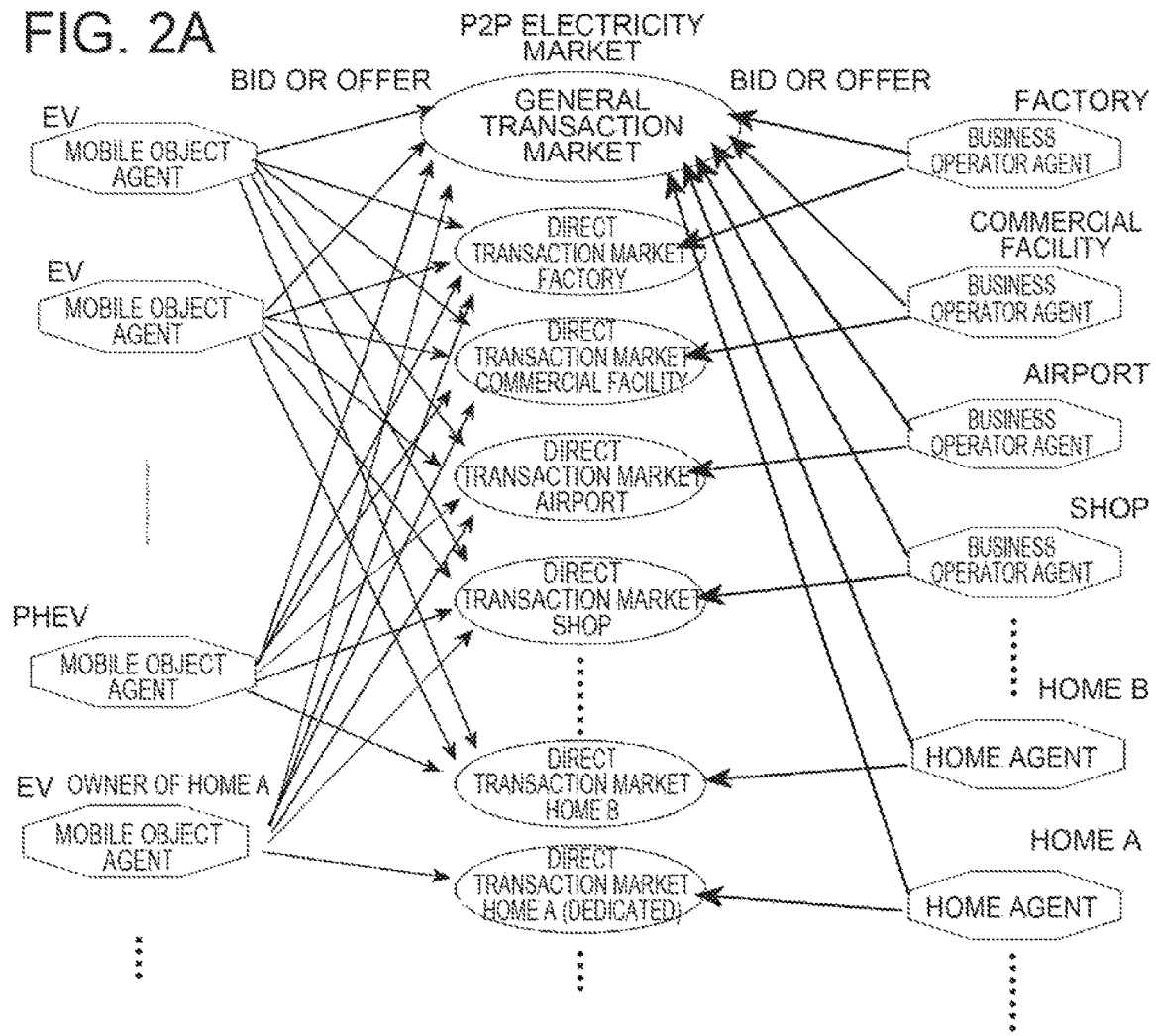
FIG. 2A schematically depicts a configuration of a system of the P2P electricity transaction market.

Various forms are considered for the P2P electricity selling and buying transaction system. In one form, as depicted in FIG. 2A, business operator agents, home agents, and mobile object (vehicle) agents exist in the system. The business operator agents respectively manage bids or offers and contracts of large electricity demanders demanding large amounts of electricity, such as relatively large-scale facilities including, for example, a factory, a commercial facility, a rail station, an airport, and the like. The home agents respectively manage bids or offers and contracts of small electricity demanders demanding an ordinary, small amount of electricity, such as homes and small- and medium-sized shops. The mobile object (vehicle) agents respectively manage bids or offers and contracts of mobile objects such as electrically driven vehicles EV. Each of the electrically driven vehicles EV, the large electricity demanders, and the small electricity demanders places a bid or an offer via the corresponding agent in charge.

Figure 2B:
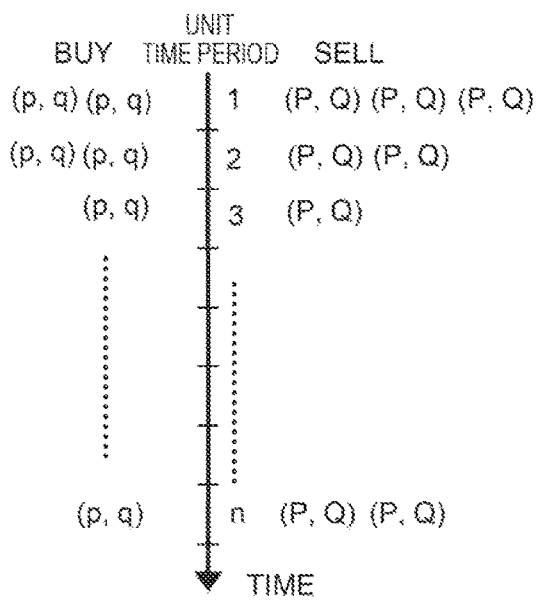
FIG. 2B is a diagram for describing an aspect of bidding and offering on a general transaction market in a P2P electricity transaction.
Figure 2C:
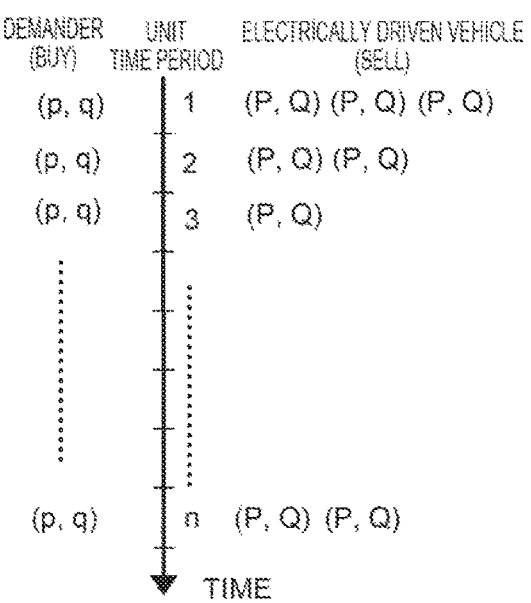
FIG. 2C is a diagram for describing an aspect of bidding and offering on a direct transaction market in a P2P electricity transaction.

Electricity traded through a P2P electricity selling and buying transaction market is transmitted through the power grid PL between electricity demanders, for which places to receive or supply electricity bid or offered via a business operator agent or a home agent are fixed. When a mobile object such as an electrically driven vehicle EV participates in a transaction, the mobile object can move to a charger-discharger facility EC at an electricity demander and directly receive or supply electricity, as described with reference to FIG. 1. Accordingly, for P2P electricity selling and buying transaction markets in which mobile objects such as electrically driven vehicles EV participate, a "general transaction market", on which a contract is executed for a transaction of electricity that is transmitted via the power grid PL between electricity demanders, and a "direct transaction market", on which a contract is executed for an electricity transaction in which a mobile object moves to a premise (into a facility) of an electricity demander and receives or supplies electricity, are configured. Since mobile objects can transmit electricity via any charger-discharger facility EC connected to the power grid PL, the mobile objects can also conduct an electricity transaction on the general transaction market. Regarding such transaction markets, as shown in FIG. 2A, on the general transaction market, bids and offers are received from a plurality of mobile objects and electricity demanders via the business operator agents, the home agents, and the vehicle agents, and a contract is executed for an offer and a bit placed by a seller and a buyer that have matching bid-offer conditions. In other words, as schematically depicted in FIG. 2B, a plurality of buyers and sellers place bids (p, q) and offers (P, Q), which are combinations of a price and an amount of electricity, in each unit time period (1, 2, . . . , n). The unit time period is a time width (generally, 30 minutes) set on a market, and a transaction of an amount of electricity is conducted for each amount of electricity transmitted within the unit time period (electric power×length of a unit time period). As for the direct transaction market, as shown in FIG. 2A, one market is configured for a fixed electricity demander at which a charger-discharger facility EC is installed. Such direct transaction markets may be individually configured on respective servers managed by the electricity demanders as shown in FIG. 2A, or a plurality of direct transaction markets may be collectively configured on a server (not shown). On each of the direct transaction markets, as shown in FIG. 2C, one demander places a bid or an offer in each unit time period (1, 2, . . . , n), offers or bids in each unit time period (1, 2, . . . , n) are accepted from a plurality of mobile objects, and a contract is executed for a bid and an offer that have matching conditions. Note that there are some cases where an owner of a mobile object is identical to an owner of a home, and in such a case, a configuration may be made such that the owners may separately place an offer or a bit by the mobile object and a bid or an offer by the home (for example, there may cases where an owner opens a market dedicated to a mobile object owned by the owner, without allowing public access to a charger-discharger, like a home A in FIG. 2A). Characteristic configurations of bid-offer condition determination apparatuses in the present embodiment, which will be described later, are targeted for a case where when an electricity demander conducts a "peak-cut" measure, the demander places a bid and a mobile object places an offer. However, each direct transaction market is configured such that an electricity demander can place an offer and a mobile object can place a bid, in an ordinary manner.

Configuration and Operation of Bid-Offer Condition Determination Apparatus for Mobile Object such as Electrically Driven Vehicle (a) Outline In the present embodiment, as an aspect, an apparatus is provided that searches for and determines a condition that is as advantageous as possible to a mobile object such as an electrically driven vehicle, as a bid-offer condition used when the mobile object places an offer or a bit on a P2P electricity selling and buying transaction market as described above. Regarding determination of the condition, since a buy price of electricity rises in a bid of an electricity demander as electricity demand increases at the electricity demander, the apparatus in the present embodiment may be configured to enable the mobile object to sell electricity by placing an offer to sell electricity when electricity demand is higher at the electricity demander, whereby a gain of the mobile object can be increased. Moreover, as mentioned in "SUMMARY", when electricity demand increases at an electricity demander, particularly at a large-scale electricity demander, and an amount of electricity procured from the grid-electricity network approaches a planned maximum amount (reference amount) or is likely to exceed the planned maximum amount, the electricity demander attempts to procure electricity through a direct transaction on the direct transaction market in order to restrain the amount of electricity procured from the grid-electricity network, that is, as a "peak-cut" measure (as described earlier, since a basic charge for the next one year rises as the amount of electricity procured from the grid-electricity network (including an amount procured based on a contract on the general transaction market) increases, the electricity demander attempts to change sources of electricity procurement in order to restrain such a cost when the amount of electricity procured from the grid-electricity network exceeds the planned amount). When the electricity demander attempts to procure electricity from the direct transaction market, in general, demand of the electricity demander is very urgent, and a bid is therefore placed at a higher price than usual in many cases. Accordingly, a gain of the mobile object can be further increased if the mobile object can predict a timing at which the electricity demander conducts the "peak-cut" measure, can place an offer to sell electricity through a direct transaction at the timing when the measure is conducted, and can enter into a contract. It is also advantageous to the electricity demander if electricity can be procured from the mobile object through the direct transaction at the timing when electricity demand increases and the "peak-cut" measure is conducted, because the amount of electricity procured from the grid-electricity network can be restrained. In such manners, according to the present embodiment, particularly for a mobile object, a configuration is provided that determines a bid-offer condition such that the mobile object can enter into a contract for a selling and buying transaction and make a more gain, by predicting a time when electricity demand of an electricity demander increases, and further a phase in which the electricity demander places a bid on a direct transaction market to procure electricity as the "peak-cut" measure, and by placing an offer based on a more adequate bid-offer condition according to such predictions.

For the bid-offer condition determination apparatus that determines a bid-offer condition for an electricity transaction of a mobile object such as an electrically driven vehicle according to the present embodiment, to put it generally, a configuration is provided that: predicts a price on the general transaction market and a buy price and a demanded amount of electricity of an electricity demander on a direct transaction market; searches, based on the prediction, for a transaction market, a sell price, and an amount of electricity to be discharged in each unit time period that make the largest gain in an electricity transaction; and uses the obtained transaction market, sell price, and amount of electricity to be discharged in each unit time period for a bid-offer condition. A configuration and operation of each section of the bid-offer condition determination apparatus may be implemented by operations according to a program of a computer apparatus provided for the mobile object. The computer apparatus may include a computer and a drive circuit. The computer includes a CPU, a ROM, a RAM, and an input-output port device mutually coupled through a bidirectional common bus in an ordinary form. The bid-offer condition determination apparatus may be configured on a computer apparatus provided to the mobile object, or may be configured by using cloud computing.

(b) Prediction of Transaction Price and Electricity Demand

Figure 3:
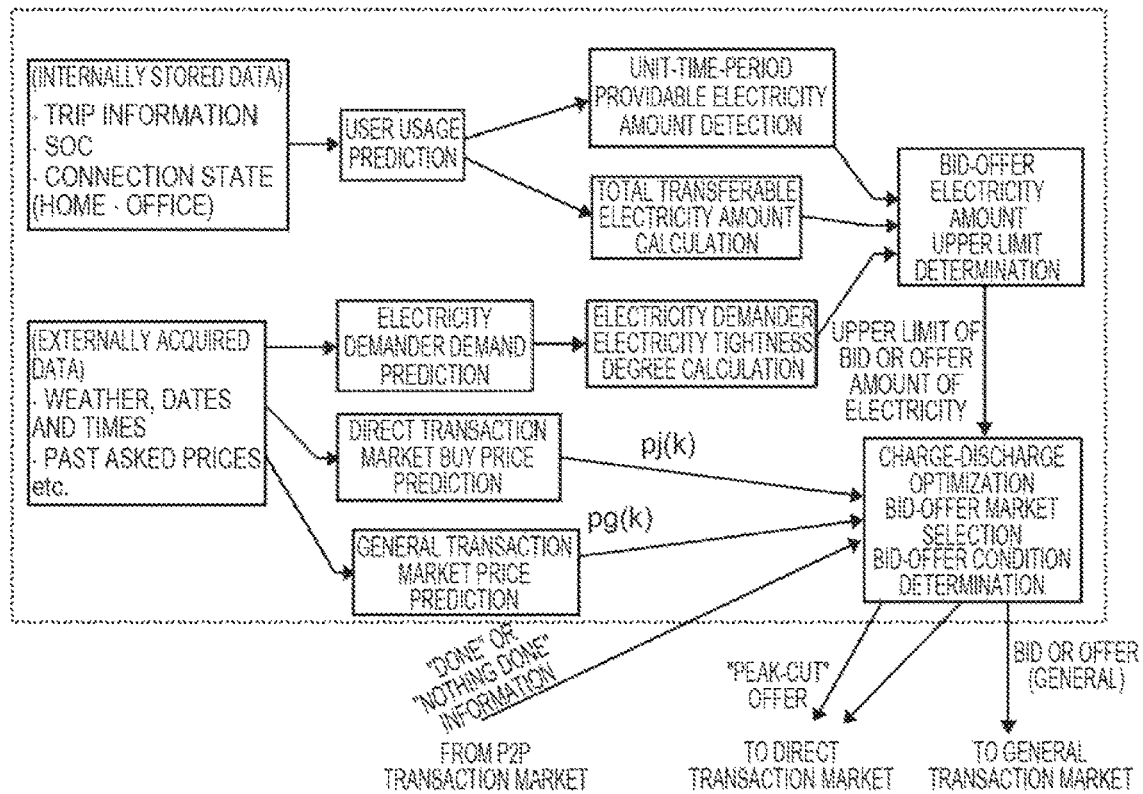
FIG. 3 shows, in a form of a block diagram, a configuration of a bid-offer condition determination apparatus for mobile object (electrically driven vehicle) in a preferred aspect according to the embodiment.
Figure 4A:
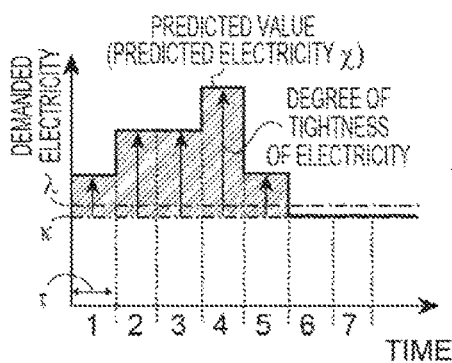
FIG. 4A shows, in a form of a graph, predicted values of an amount of electricity demanded by an electricity demander that are predicted by the bid-offer condition determination apparatus for mobile object (electrically driven vehicle) according to the embodiment.

Referring to FIG. 3, according to the configuration of the bid-offer condition determination apparatus that determines a bid-offer condition for an electricity transaction of a mobile object, specifically, an internally stored data collection section and an externally acquired data collection section are provided. The internally stored data collection section collects internal information on the mobile object, such as travel and operation data (trip information) on the mobile object such as an electrically driven vehicle from the past to the present, data on changes in SOC of the storage battery, and data on a state of connection to a charger-discharger at home or office. The externally acquired data collection section acquires external information, including climate information such as weather and atmospheric temperatures, dates and times, past asked prices on electricity transaction markets, and the like. Based on the information acquired by the internally stored data collection section, a user usage prediction section predicts future usage of the mobile object, such as future travel data, a place of connection, and a duration of stop, in an arbitrary manner. On the other hand, the information acquired by the externally acquired data collection section is first referred to by a general transaction market price prediction section and compared by the general transaction market price prediction section with data on past weather, dates and times (holidays, weekdays, presence or absence of an event), past demand, past electricity prices on the general transaction market, and the like, and predicted values of a future electricity transaction price on the general electricity transaction market are determined in an arbitrary manner (a predicted value of the price may be determined for each unit time period on the market). Moreover, the information acquired by the externally acquired data collection section is referred to by a direct transaction market buy price prediction section and compared by the direct transaction market buy price prediction section with data on past weather, dates and times (holidays, weekdays, presence or absence of an event), past demand, past contracted prices on the direct transaction markets, and the like, and predicted values of a buy price of electricity on a direct transaction market from the present into the future are determined in an arbitrary manner. Note that a predicted value of the price may be determined for each unit time period on the market, and in prediction of the buy price on the direct transaction market, buy prices on a plurality of direct transaction markets where a plurality of electricity demanders place bids, respectively, may be predicted. Further, the information acquired by the externally acquired data collection section is also referred to by an electricity demander demand prediction section and compared by the electricity demander demand prediction section with data on past weather, dates and times (holidays, weekdays, presence or absence of an event), changes in past demand, and the like, and predicted values of an amount of electricity demanded by an electricity demander from the present into the future are determined in an arbitrary manner. Here, as schematically depicted in FIG. 4A, a predicted value of the amount of electricity demanded by the electricity demander may be determined for each unit time period on the market. Predicted values of the demanded amount of electricity may be determined for each of electricity demanders that respectively place bids on direct transaction markets where the mobile object may possibly place an offer. A direct transaction market where the mobile object may possibly place an offer may be arbitrarily selected, based on a positional relationship between the mobile object and an electricity demander, from among markets on which electricity demanders, located within a range where the mobile object can supply electricity, place bids. The transaction prices and the electricity demand may be predicted over any number of unit time periods that can be arbitrarily set.

(c) Setting of Condition for Distribution of Bid or Offer Amount of Electricity According to Changes in Amounts of Electricity Demanded by Electricity Demanders When the transaction prices on the transaction markets and the electricity demand of the electricity demanders are predicted by using the internally stored data and the externally acquired data as described above, an optimal bid-offer condition expected to make the largest gain for the mobile object is searched for by using such predicted values. To search for such an optimal bid-offer condition, according to the apparatus of the present embodiment in particular, a configuration is provided that makes it possible to distribute an amount of electricity suppliable from the mobile object to electricity demanders, according to changes in the amount of electricity demanded by each electricity demander, based on results of the prediction of the amounts of electricity demanded by the electricity demanders. In such a configuration for distribution of the amount of electricity, as shown in FIG. 3, a unit-time-period providable electricity amount detection section, a total transferable electricity amount calculation section, an electricity demander electricity tightness degree calculation section, and a bid-offer electricity amount upper limit determination section are provided.

Figure 4B:
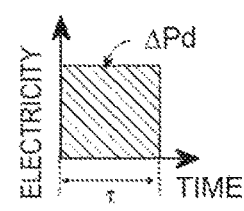
FIG. 4B is a diagram for describing an amount of electricity that can be discharged in a unit time period by a mobile object and that is detected by a unit-time-period providable electricity amount detection section of the bid-offer condition determination apparatus for mobile object (electrically driven vehicle) according to the embodiment.
Figure 4C:
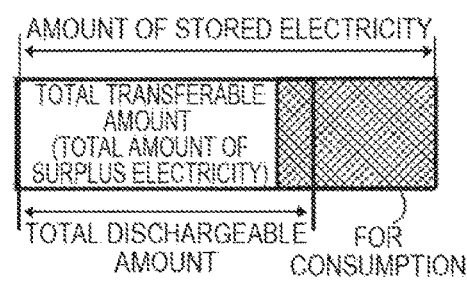
FIG. 4C is a diagram for describing a total amount of electricity that can be transferred from the mobile object (electrically driven vehicles) in an electricity transaction and that is calculated by a total transferable electricity amount calculation section of the bid-offer condition determination apparatus for mobile object (electrically driven vehicle) according to the embodiment.

Specifically, first, by using the results of the prediction by the user usage prediction section, the unit-time-period providable electricity amount detection section detects an amount of electricity (amount of electricity providable per unit time period) $\Delta Pd$ that can be discharged from the storage battery of the mobile object per unit time period $\tau$ when the mobile object is connected to a charger-discharger facility in a facility of an electricity demander, as schematically shown in FIG. 4B, and that depends on performance of the charger-discharger facility. The amount of electricity providable per unit time period $\Delta Pd$ may be detected for each charger-discharger facility at each electricity demander to which the mobile object can supply electricity. An electricity demander to which the mobile object can supply electricity can be selected based on the future travel data in the results of the prediction by the user usage prediction section, in an arbitrary manner. As schematically depicted in FIG. 4C, the total transferable electricity amount calculation section may be configured to calculate a total amount of transferable electricity by: calculating an amount of stored electricity that can be externally used (total amount of surplus electricity) by subtracting a predicted value of an amount of electricity consumed for traveling and the like of the mobile object, which is estimated from the future travel data, from a predicted value of a current amount or a future amount of electricity stored in the storage battery of the mobile object, which is detected or estimated by referring to the SOC change data or the like; further calculating a total amount of electricity that can be discharged while the mobile object is stopped (total amount of dischargeable electricity) based on a planned duration for which the mobile object is stopped at the electricity demander and a discharge rate of the charger-discharger facility for the planned duration; and using a smaller one of the total amount of surplus electricity and the total amount of dischargeable electricity for a total amount of electricity that can be actually supplied to the electricity demander.

Figure 4D:
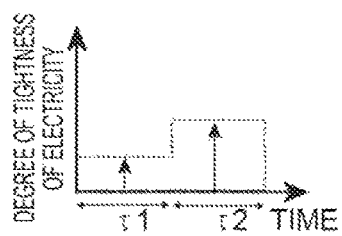
FIG. 4D is a diagram for describing a degree of tightness of electricity that is calculated by an electricity demander electricity tightness degree prediction section of the bid-offer condition determination apparatus for mobile object (electrically driven vehicle) according to the embodiment.

The electricity demander electricity tightness degree calculation section calculates a degree of tightness of electricity, based on the results of the prediction of the electricity demand of each electricity demander determined by the electricity demander demand prediction section. The degree of tightness of electricity indicates a magnitude of an extent to which a predicted value of the amount of electricity demanded by an electricity demander in each unit time period exceeds a maximum planned amount (reference value) of electricity to be procured from the grid-electricity network, which is preset by the electricity demander. More specifically, as schematically shown in FIG. 4A, the degree of tightness of electricity may be determined for each unit time period. Specifically, for example, assuming that the maximum planned amount of electricity to be procured by the electricity demander from the grid-electricity network is $\lambda$ ($\lambda \cdot \tau$ when converted into a maximum planned amount of electricity per unit time period $\tau$), a value that is proportional to an excess (a shaded area in FIG. 4A) in the demanded amount of electricity $\chi$ in unit time period over the maximum planned amount of electricity $\lambda$, or over a predetermined value $\kappa$ that is smaller than $\lambda$ by an amount that can be appropriately set, may be calculated as the degree of tightness of electricity. In other words, as shown in FIG. 4D, the degree of tightness of electricity may be calculated, for each unit time period, as a value that is proportional to ($\chi-\lambda$) or ($\chi-\kappa$). Information on the maximum planned amount of electricity to be procured by an electricity demander from the grid-electricity network may be acquired beforehand from the electricity demander, or may be estimated from past records of transactions on the market.

Figure 4E:
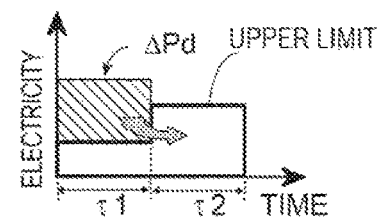
FIG. 4E is a diagram for describing an upper limit of an offer amount of electricity in an offer by the mobile object (electrically driven vehicle) that is determined by a bid-offer electricity amount upper limit determination section of the bid-offer condition determination apparatus for mobile object (electrically driven vehicle) according to the embodiment.

When the amount of electricity providable per unit time period, the total amount of transferable electricity, and the degrees of tightness of electricity are obtained, the bid-offer electricity amount upper limit determination section performs processing of determining an upper limit of an offer amount of electricity in each unit time period such that the offer amount of electricity is distributed according to magnitudes of the amounts of electricity demanded by electricity demanders. In the processing, to put it simply, the upper limits of the offer amount of electricity may be set to values that are obtained by distributing the total amount of electricity transferable from the mobile object to each unit time period such that the total amount of transferable electricity is distributed according to the magnitudes of the degrees of tightness of electricity, that is, such that in a unit time period in which the degree of tightness of electricity is larger, a higher upper limit of the offer amount of electricity is set than an upper limit in a unit time period in which the degree of tightness of electricity is smaller. At the time, a maximum value is adjusted such as not to exceed the amount of electricity providable per unit time period. By doing so, for example, when the degrees of tightness of electricity are distributed between unit time periods $\tau 1$, $\tau 2$ as schematically shown in FIG. 4D, the upper limits of the offer amount of electricity are determined in such a manner that an amount of electricity corresponding to the total amount of transferable electricity is distributed between the unit time periods $\tau 1$, $\tau 2$ according to the degrees of tightness of electricity such that the amount of electricity providable per unit time period $\Delta$Pd is not exceeded, as schematically shown in FIG. 4E. By setting the upper limits of the offer amount of electricity in such a manner, a larger offer amount of electricity is allowed for a larger degree of tightness of electricity in each unit time period, in the processing of searching for an optimal bid-offer condition that is expected to make the largest gain for the mobile object, which will be described later. Accordingly, it is expected that more mobile objects place offers to sell more amounts of electricity in a unit time period in which electricity demand of an electricity demander is higher, particularly, in a unit time period in which the degree of tightness of electricity is larger.

(d) Processing of Optimizing Charge-Discharge Condition

When the upper limits of the offer amount of electricity are thus determined as a condition for distribution of the offer amount of electricity that enables a larger amount of electricity to be procured for an electricity demander presenting higher electricity demand, a search is performed, based on the condition for distribution of the offer amount of electricity, for a bid-offer condition that makes the largest gain for the mobile object, by using the predicted transaction prices on the transaction markets. In the processing, an objective function $f_{cost}$ that calculates a cost incurred in an electricity selling and buying transaction is set as an index value indicating a profit or a loss in the electricity selling and buying transaction, and a sell or buy amount of electricity that minimizes the objective function $f_{cost}$ is searched for, under a constraint condition regarding upper and lower limits of SOC that need to be satisfied for the storage battery of the mobile object (within the chargeable and dischargeable ranges of the storage battery).

Specifically, first, the objective function $f_{cost}$ may be set as follows:

$$f_{cost}(i, n) \sum_{k=i}^{i+n} \left\{ r_{connect}(k) \cdot F_g(k) + \sum_{j}^{m} u_{connect}^j(k) F_j(k) \right\} \quad (1)$$

where k (=i to (i+n) where i is a current unit time period) is a sign representing a unit time period, $r_{connect}(k)$ is a variable that is 1 when the mobile object supplies or procures electricity through the general transaction market (is connected to a charger-discharger facility connected to the power grid) in a unit time period k, and otherwise 0, j is a sign representing an electricity demander that places a bid on a direct transaction market, and $u_{connect}^j(k)$ is a variable that is 1 when the mobile object supplies or procures electricity through a direct transaction market on which an electricity demander j places a bid (is connected to a charger-discharger facility of the electricity demander j) in a unit time period k, and otherwise 0. $F_g(k)$ is a cost incurred when the mobile object supplies or procures electricity through the general transaction market in a unit time period k, and is given by a following expression:

$$F_g(k) = q_{buy}(k) \cdot (P_g(k) + \delta) - q_{sell}(k) \cdot P_g(k) \quad (2)$$

where $P_g(k)$ is a predicted value of a sell or buy price (per unit amount of electricity) on the general transaction market in a unit time period k, $q_{buy}(k)$, $q_{sell}(k)$ are a desired buy amount of electricity and a desired sell amount of electricity in a unit time period k, respectively, and $\delta$ is an additional wheeling charge (a fee for use of the power grid). $F_j(k)$ is a cost incurred when the mobile object supplies or procures electricity through a direct transaction market on which an electricity demander j places a bid in a unit time period k, and is given a following expression:

$$F_j(k) = P_j(k)(q_{buy}(k) - q_{sell}(k)) \quad (3)$$

where $P_j(k)$ is a predicted value of a buy price (per unit amount of electricity) on the direct transaction market of the electricity demander j in a unit time period k, and $q_{buy}(k)$, $q_{sell}(k)$ are a desired buy amount of electricity and a desired sell amount of electricity in a unit time period k, respectively.

The SOC of the storage battery of the mobile object is given by a following expression:

$$SOC(i, n) = SOC(i) + \sum_{k=i}^{i+n} (q_{buy}(k) - q_{sell}(k) - q_{trip}(k))/C \quad (4)$$

where $q_{trip}(k)$ is a predicted value of an amount of electricity consumed by the mobile object for traveling in a unit time period k (which may be acquired from the user usage prediction section), and C is a conversion factor for converting an amount of electricity into SOC. For SOC, an upper limit $SOC_{UpperLimit}$ and a lower limit $SOC_{LowerLimit}$ are set, and it is a constraint condition that SOC satisfies a following expression:

$$SOC_{LowerLimit} \leq SOC(k) \leq SOC_{UpperLimit} \quad (5)$$

Thus, by using each predicted value of the sell or buy price on the general transaction market and each predicted value of the buy price on the direct transaction market of each electricity demander for Pg(k), Pj(k), respectively, in the objective function $f_{cost}$, a condition that minimizes the objective function $f_{cost}$ is searched for (optimization of the objective function) by variously changing the values of $q_{buy}(k)$, $q_{sell}(k)$ while expression (5) is satisfied, under a condition that the storage battery of the mobile object is connected to a charger-discharger facility on one place at a time (only one of $r_{connect}(k)$ and $u_{connect}^j(k)$ is 1 and the other is 0 in a unit time period k), and a condition regarding the upper limits of the bid or offer amount of electricity previously described. For the optimization processing, processing using any numerical operations may be used, such as linear programing or convex optimization.

When the processing for optimization of the objective function is performed and optimal conditions are detected as described above, then for each unit time period, a transaction market corresponding to $r_{connect}(k)$ or $u_{connect}^j(k)$ that indicates "1" in an optimal condition is selected as a bid-offer destination, and a predicted value of the price used in the optimal condition and a desired buy amount of electricity or a desired sell amount of electricity found for the optimal condition are determined as a hid-offer condition, and an offer or a bid is placed in each unit time period. Here, when electricity demand of a specific electricity demander is not high, the mobile object places an offer to sell or a bid to buy electricity on the general transaction market or a direct transaction market, based on predicted values of bid and offer prices and amounts of electricity predicted to be consumed in each time period.

When it is predicted that electricity demand of an electricity demander becomes particularly high, or when it is predicted that an electricity demander will conduct the "peak-cut" measure, it can be expected that the electricity demander will place a bit on a direct transaction market, for a more desired buy amount of electricity at a higher buy price than usual. Accordingly, the objective function becomes smallest when a more desired sell amount of electricity is set, according to the prediction, on the direct transaction market on which the electricity demander presenting higher electricity demand, or the electricity demander expected to conduct the "peak-cut" measure, places a bid, so that such a case is detected as an optimal condition. For each unit time period k, an offer or a bid is placed on a direct transaction market that gives the detected optimal condition, at a price for an amount of electricity that give the optimal condition.

In the configuration, when a contract is executed for an offer or a bid on the general transaction market, the mobile object supplies or receives electricity at a charger-discharger facility EC installed on the power grid PL. To transmit a contracted amount of electricity via the power grid PL, a method for ensuring traceability in electricity transmission is introduced on the market. When a contract is executed for an offer or a bid on a direct transaction market, the mobile object discharges or charges a sold or bought amount of electricity at a charger-discharger facility installed at an electricity demander that is the other party of the contract executed on the market.

Figure 5:
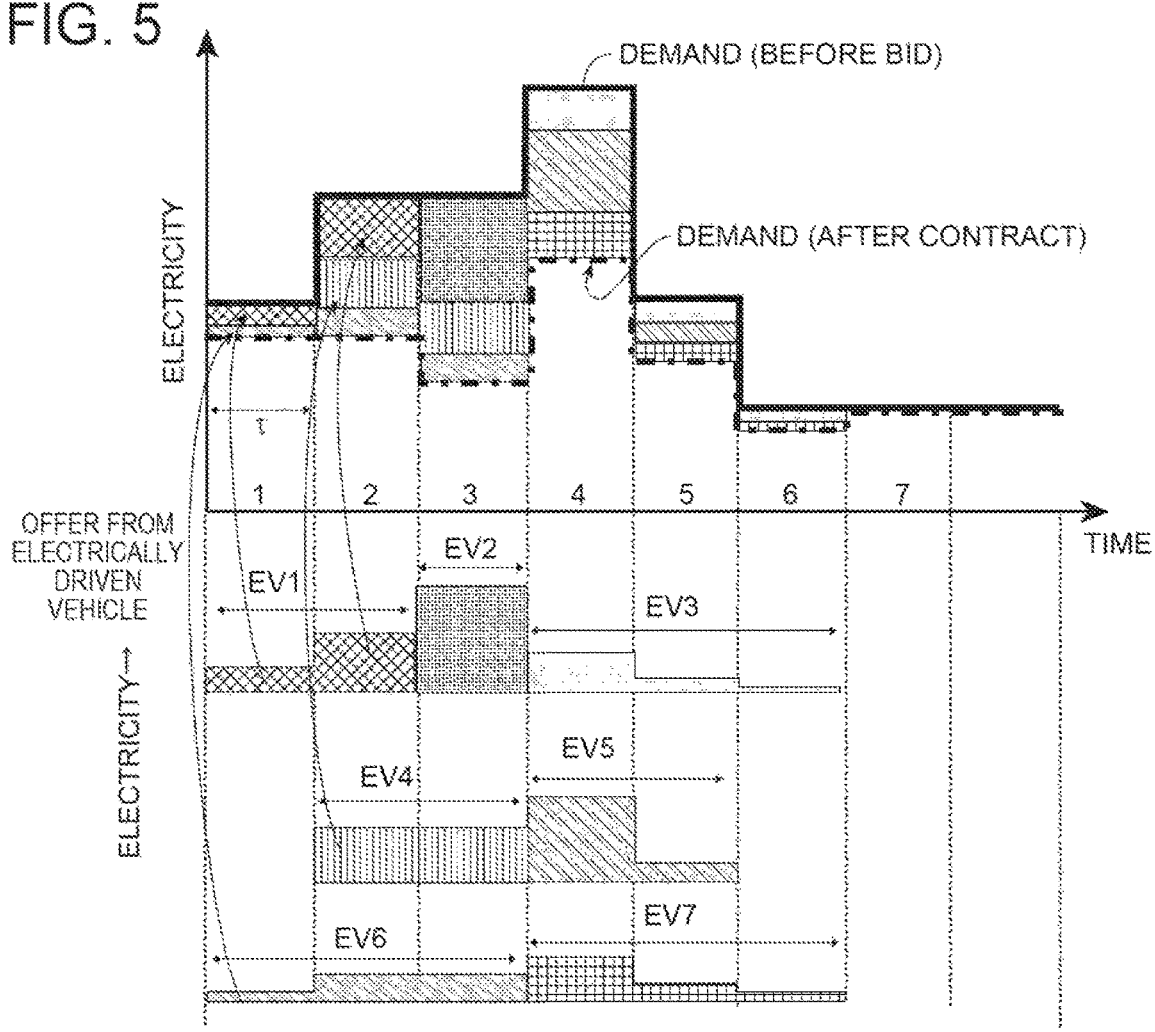
FIG. 5 is a diagram for describing changes over time in an amount of electricity demanded by an electricity demander, and in an amount of electricity supplied from electrically driven vehicles to the electricity demander through an electricity transaction based on offers that are placed according to conditions, each determined by using the bid-offer condition determination apparatus according to the embodiment.

As described above, according to the configuration, it can be expected that offers to sell electricity can be more easily collected from mobile objects for an electricity demander presenting higher electricity demand, and the electricity demander can more easily procure electricity for the "peak-cut" measure. To put it more specifically, according to the configuration of the present embodiment, since it can be thought that levels of buy prices bid on direct transaction markets move along with the degrees of tightness of electricity, it is expected that mobile objects sell electricity in a time period in which an electricity demander desires to conduct a "peak-cut" (a time period in which electricity can be bought at a higher price). Moreover, electricity demanders can more easily collect a desired amount of electricity because electricity demanders need the "peak-cut" measure during a time period when many people gather in many cases, and more mobile objects tend to gather accordingly during such a time period when people gather. According to the apparatus of the present embodiment, since each mobile object individually calculates an offer or bid amount, based on a duration of connection of the mobile object and the degrees of tightness of electricity of demanders, a sufficient number of mobile objects are connected to an electricity demander presenting a higher degree of tightness of electricity, and consequently, demand curves of electricity demanders are evened out to some extent. For example, as shown in FIG. 5, when electricity demand occurs at an electricity demander, it can be expected that many mobile objects predict such a fact and place offers to sell electricity on a direct transaction market of the electricity demander, so that as much electricity as needed for the "peak-cut" measure can be procured from a plurality of mobile objects through direct transactions. Accordingly, as can be understood by referring to unit time periods 2 to 5 in FIG. 5, more electricity can be procured from mobile objects in a unit time period in which the electricity demander presents higher demand, and it can therefore be expected that a demand curve of the electricity demander after contracts are executed is shallower than a demand curve before bidding is conducted, as described above. In other words, each mobile object equipped with the apparatus of the present embodiment makes similar movement, whereby many of the mobile objects gather to an electricity demander presenting higher electricity demand, and offers autonomously meet the demand of the electricity demander. Moreover, since electricity supply or procurement through a direct transaction market is conducted in a premise of an electricity demander, and since a vehicle transports electricity, a transaction without using the power grid, and accordingly free of wheeling charge, can be conducted, so that a cost reduction can be achieved, and loads on the power grid can be reduced.

In the configuration of the present embodiment, as shown in FIG. 3, the charge-discharge optimization processing may be configured such that a result of an offer or a bid is referred to, charge-discharge optimization processing is repeated, and the optimal condition is updated. Specifically, when a contract is executed for an offer or a bid, the mobile object may correct parameters used in the objective function, such as a market selected as a bid-offer destination, predicted values of the prices, or upper limits of the bid or offer amount of electricity, while taking into consideration a duration of electricity transmission and an amount of electricity to be transmitted for the duration in the contract, may perform the charge-discharge optimization processing again, and may perform a search for a new optimal condition and determination of a bid-offer condition. Even when a contract is not executed for an offer or a bid, the mobile object may correct the parameters used in the objective function, such as a market selected as a bid-offer destination, predicted values of the prices, or upper limits of the bid or offer amount of electricity, such that a bid-offer condition resulting in no contract being executed is excluded, may perform the charge-discharge optimization processing again, and may perform a search for a new optimal condition and determination of a bid-offer condition.

Configuration and Operation of Bid-Offer Condition Determination Apparatus for Electricity Demander (a) Outline Further according to the present embodiment, in a case where an electricity demander places a bid on a P2P electricity selling and buying transaction market as described above, an apparatus is provided that, particularly when electricity demand of the electricity demander becomes high and the amount of electricity procured from the grid-electricity network is likely to exceed a planned maximum amount, captures such a phase, enables electricity procurement through a direct transaction market as the "peak-cut" measure, and determines a bid-offer condition. As already mentioned in the description of the bid-offer condition determination apparatus for mobile object, the bid-offer condition determination apparatus for mobile object is configured to: predict that electricity demand of an electricity demander becomes high and the "peak-cut" measure will be conducted; predict that in such a case, a buy price of electricity of the electricity demander will be higher than usual; and determine a bid-offer condition. Accordingly, in order to facilitate entering into a contract for an offer from such a mobile object, the bid-offer condition determination apparatus for electricity demander may be configured to determine a bid-offer condition in which a buy price is set higher than usual when it is predicted that a situation requiring the "peak-cut" measure will occur. A configuration and operation of each section of the bid-offer condition determination apparatus may be implemented by operations according to a program of a computer apparatus provided for the electricity demander. The computer apparatus may include a computer and a drive circuit. The computer includes a CPU, a ROM, a RAM, and an input-output port device mutually coupled through a bidirectional common bus in an ordinary form. The bid-offer condition determination apparatus may be configured on a computer apparatus provided in a facility of the electricity demander, or may be configured by using cloud computing.

(b) Prediction of Demand and Determination of Bid-Offer Condition

Figure 6:
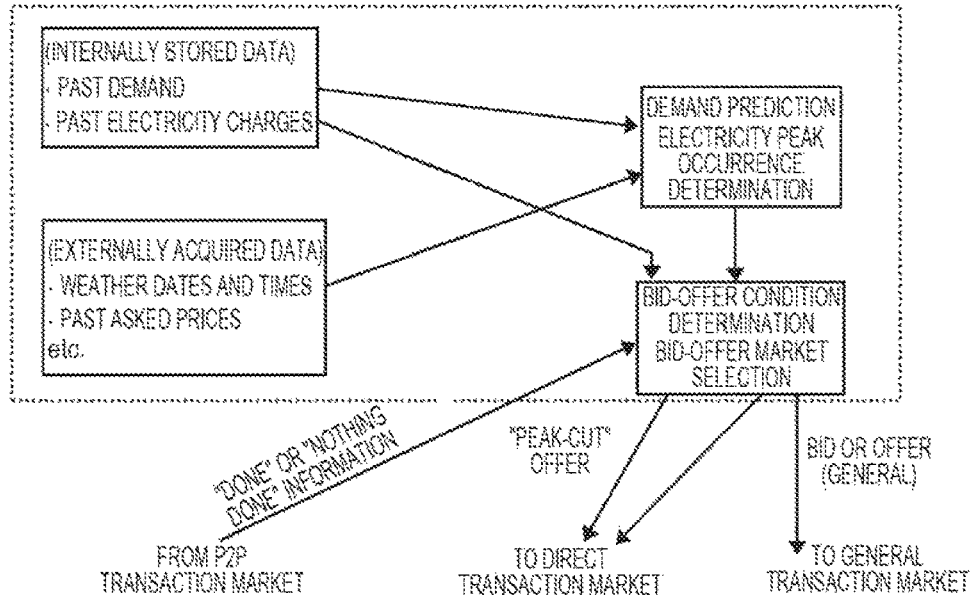
FIG. 6 shows, in a form of a block diagram, a configuration of a bid-offer condition determination apparatus for electricity demander in a preferred aspect according to the embodiment.

Referring to FIG. 6, the bid-offer condition determination apparatus for electricity demander is also provided with an internally stored data collection section and an externally acquired data collection section, similarly to the bid-offer condition determination apparatus for mobile object. The internally stored data collection section collects information related to an internal state of the electricity demander, such as information including changes in past demand, past electricity transaction prices, basic charges, and the like. The externally acquired data collection section acquires external information, including climate information such as weather and atmospheric temperatures, dates and times, past asked prices on electricity transaction markets, and the like. By using the information acquired by the internally stored data collection section and the externally acquired data collection section, an electricity demand prediction section determines a predicted value of an amount of electricity demanded by the electricity demander in each unit time period, according to an arbitrary algorithm. A time width for which a prediction is made may be set as appropriate. Here, when a unit time period is detected in which a predicted value of the demanded amount of electricity exceeds a preset maximum planned amount of electricity to be procured from the grid-electricity network, or when a unit time period is detected in which a predicted value of the demanded amount of electricity approximates to the maximum planned amount, such a unit time period, as an electricity peak occurrence period, may be identified as a period when the "peak-cut" measure needs to be conducted. In other words, as in the case shown in FIG. 4A, a period (shaded area) in which a predicted value of the demanded amount of electricity exceeds the maximum planned amount $\lambda$ or the predetermined value $\kappa$ approximates to the maximum planned amount, such a period may be identified as an electricity peak occurrence period.

When predicted values of the amount of electricity demanded by the electricity demander are obtained as described above, a bid-offer condition determination section determines a desired buy or sell amount of electricity to be bid or offered, according to an arbitrary algorithm, based on the predicted value of the demanded amount of electricity in each unit time period. For the desired buy or sell amount of electricity to be bid or offered, the predicted value of the demanded amount of electricity in each unit time period may be set as it is, or an arbitrarily corrected value (for example, an amount obtained by subtracting an amount procured from the grid-electricity network from the demanded amount of electricity) may be set. The bid-offer condition determination section compares to find correlations between the past demand and prices collected by the internally stored data collection section, and determines a buy or sell price to be bid or offered in each unit time period, according to the predicted value of the demanded amount of electricity. A transaction market to be a bid-offer destination may be determined based on each predicted value of the demanded amount of electricity. When an electricity peak occurrence period is not predicted in the prediction of the demanded amount of electricity as described above, the general transaction market or the direct transaction market is selected as a bid-offer destination, and a bid-offer condition may be determined by using a price set such as to be advantageous to the electricity demander. When an electricity peak occurrence period is predicted in the prediction of the demanded amount of electricity as described above, a bid-offer condition for buying electricity is determined in which the direct transaction market is set as a bid-offer destination, in order to procure electricity without using the power grid PL, as the "peak-cut" measure.

Figure 7:
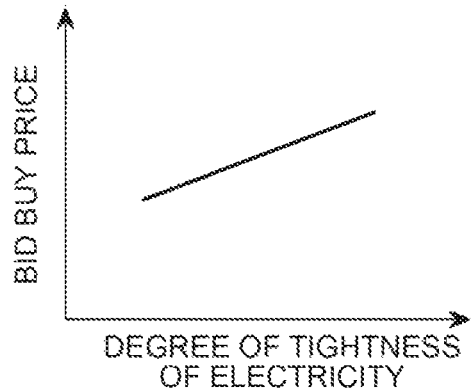
FIG. 7 schematically shows setting of bid buy price against degree of tightness of electricity in electricity demand at an electricity demander.

When the "peak-cut" measure is conducted, since it is desired to procure electricity as soon as possible, a buy price to be bid may be set higher than usual, in order to be able to more easily enter into a contract for buying electricity. Specific processing of setting the buy price may be performed in an arbitrary manner. The buy price to conduct the "peak-cut" measure may be a fixed price, but may be increased or decreased along with an increase or a decrease in the demanded amount of electricity. In the apparatus for electricity demander, particularly the electricity demand prediction section may also be provided with a configuration that determines a degree of tightness of electricity as described with reference to FIGS. 4A, 4D, with respect to the amount of electricity demanded by the electricity demander, and the buy price for the "peak-cut" measure to be bid on the direct transaction market may be set to higher prices as the degree of tightness of electricity increases, as shown in FIG. 7.

When a bid-offer condition is determined, a bid or an offer is placed on the selected market. The other party of an electricity transaction can be any one of a mobile object and another electricity demander in a case of the general transaction market, and is a mobile object in a case of the direct transaction market.

In the apparatus for electricity demander, as shown in FIG. 6, the bid-offer condition determination section may also be configured further to refer to a result of the bid or offer and update the bid-offer condition. As in the case of the apparatus for mobile object, when a contract is executed for the bid or offer, a bid-offer condition may be set by correcting a market selected as a bid-offer destination, a price, an amount of electricity, while a duration of electricity transmission and an amount of electricity to be transmitted for the duration in the contract are taken into consideration. When a contract is not executed for the bid or offer, a bid-offer condition may also be set by correcting a market selected as a bid-offer destination, a price, an amount of electricity such that the bid-offer condition resulting in no contract being executed is excluded.

Accordingly, according to the bid-offer condition determination apparatus for electricity demander, electricity demand of an electricity demander is predicted, a case requiring the "peak-cut" measure is detected, and in such a case, a bid-offer condition is determined such that electricity can be more easily procured through a direct transaction without using the power grid. Thus, also a mobile object such as an electrically driven vehicle becomes able to more easily supply electricity in response to the electricity "peak-cut" measure conducted by the electricity demander, and can more easily increase a gain from an electricity transaction (minimize an electricity cost).

Other Embodiments of Bid-Offer Condition Determination Apparatuses

The configurations of the bid-offer condition determination apparatus for mobile object and the bid-offer condition determination apparatus for electricity demander may be partially changed, as described below.

Figure 8A:
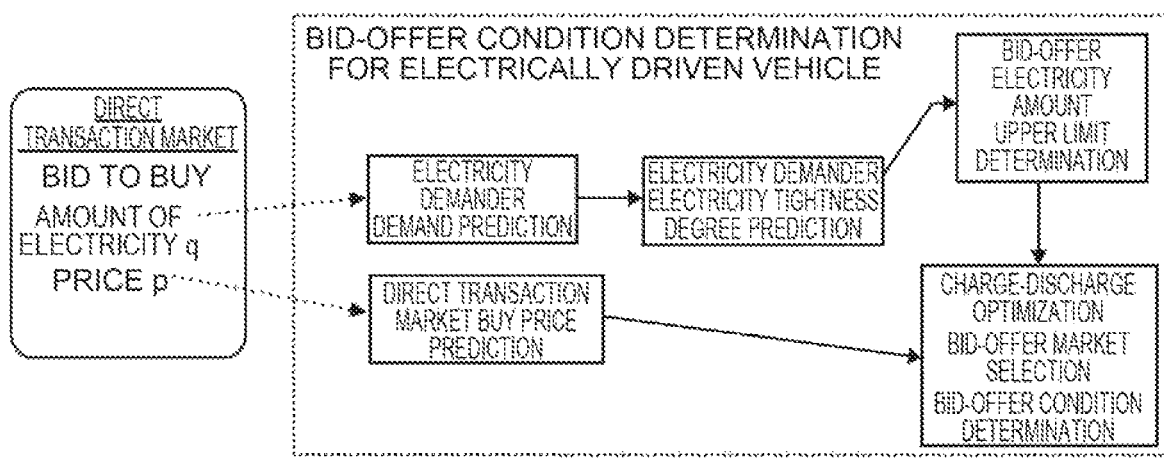
FIG. 8A shows, in a form of a block diagram, a configuration in which a modification is made such that an electricity demander demand prediction section and a direct transaction market buy price prediction section of the bid-offer condition determination apparatus for mobile object (electrically driven vehicle) according to the embodiment predict demand of the electricity demander and buy prices, respectively, by referring to a desired buy amount of electricity and a buy price in a bit placed by the electricity demander on a direct transaction market, wherein only parts changed from the configuration of the bid-offer condition determination apparatus for mobile object (electrically driven vehicle) in FIG. 3 are depicted.

(a) Change in Configuration of Bid-Offer Condition Determination Apparatus for Mobile Object In the bid-offer condition determination apparatus for mobile object illustrated in FIG. 3, the electricity demander demand prediction section and the direct transaction market buy price prediction section may be configured to acquire information on a desired buy amount of electricity and a desired buy price bit by an electricity demander on a direct transaction market, and to respectively predict, based on the information, predicted values of the amount of electricity demanded by the electricity demander on the direct transaction market from the present into the future, and predicted values of the buy price of electricity from the present into the future, as shown in FIG. 8A. For the predicted values of the demanded amount of electricity, the desired buy amount of electricity on the direct transaction market may be used as it is, or amounts obtained by correcting the desired buy amount of electricity in an arbitrarily manner may be used. For the predicted values of the buy price, the desired buy price on the direct transaction market may be used as it is, or prices obtained by correcting the desired buy price in an arbitrarily manner may be used. According to such a configuration, the apparatus for mobile object operates such as to maximize a gain, and therefore places an offer in a unit time period in which the buy price is higher, or in a unit time period in which the desired buy amount of electricity is larger, on a direct transaction market. As a result, it can be expected the electricity demander side can use electricity of mobile objects for the "peak-cut" measure.

Figure 8B:
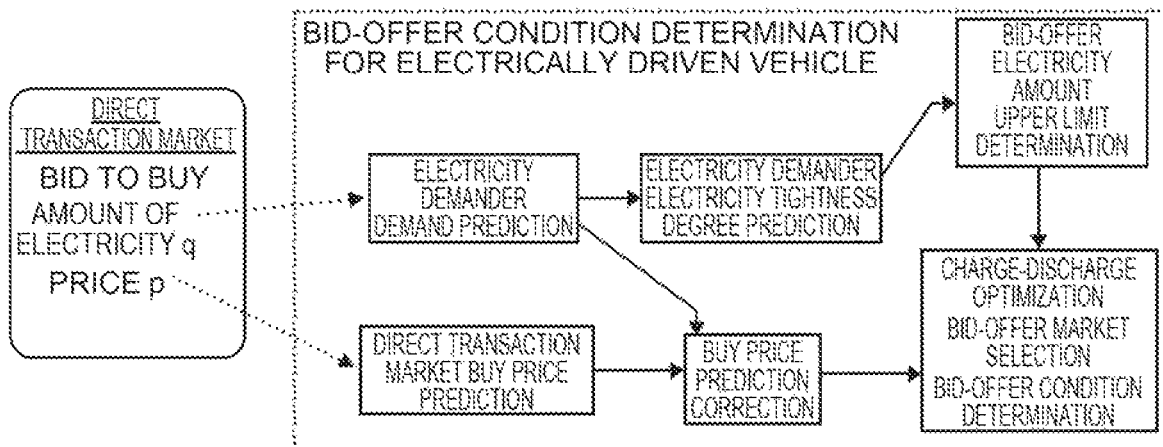
FIG. 8B shows, in a form of a block diagram, a configuration in which a further modification is made such that predicted values of the buy price are corrected, based on predicted values of the demand of the electricity demander obtained by referring to the desired buy amount of electricity in the bid placed by the electricity demander on the direct transaction market, wherein only parts changed from the configuration of the bid-offer condition determination apparatus for mobile object (electrically driven vehicle) in FIG. 3 are depicted.

In addition to the configuration in FIG. 8A, the configuration may be made such that the predicted values of the buy price obtained by the direct transaction market buy price prediction section are further corrected by referring to the predicted values of the demanded amount of electricity, as shown in FIG. 8B. In such a configuration, since electricity demand of an electricity demander is in a tight state when a predicted value of the demanded amount of electricity is large, a predicted value of the buy price can be rewritten to a higher price or a lower price in order to allow the mobile object to more easily sell electricity. According to such a configuration, even in a situation where the electricity demander side is not allowed to change a bid price on a market, each mobile object autonomously determines a unit time period in which the "peak-cut" measure is conducted, and can contribute to the "peak-cut" measure.

Figure 9:
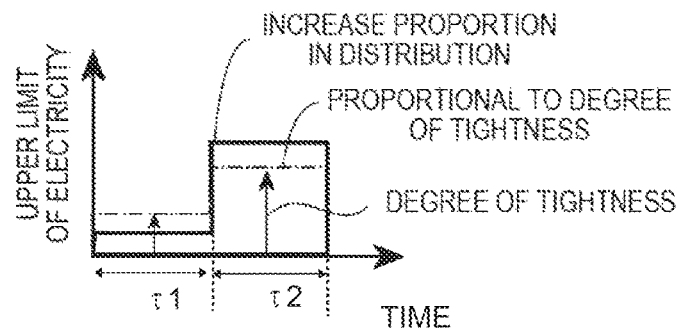
FIG. 9 is a diagram for describing upper limits of the offer amount of electricity in an offer placed by the mobile object (electrically driven vehicle) that are determined as in FIG. 4E by the bid-offer electricity amount upper limit determination section of the bid-offer condition determination apparatus for mobile object (electrically driven vehicle) according to the present embodiment, and show a case where a proportion of an upper limit of the amount of electricity in a unit time period in distribution is increased, compared to a proportion of a degree of tightness of electricity in the unit time period.

Moreover, in the processing of determining an upper limit of the bid or offer amount of electricity in each unit time period at the bid-offer electricity amount upper limit determination section of the bid-offer condition determination apparatus for mobile object, when the upper limits of the bid or offer amount of electricity are set according to the magnitudes of degrees of tightness of electricity such that a total amount of transferable electricity from the mobile object is distributed according to the magnitudes of the degrees of tightness of electricity, a proportion in a unit time period in distribution of the total amount of transferable electricity may be set larger than a proportion of a degree of tightness of electricity in the unit time period. Specifically, for example, referring to FIG. 9, when a ratio between degrees of tightness of electricity in unit time periods $\tau 1$, $\tau 2$ is a:b (a<b, a+b=c), upper limits of the bid or offer amount of electricity may be distributed such that a ratio between the upper limits of the bid or offer amount of electricity becomes (a−x):(b+x). Alternatively, by using a degree of tightness of electricity $\gamma$ and a total amount of transferable electricity Po, an upper limit of the bid or offer amount of electricity may be given as $\theta \gamma^2 Po$ ($\Sigma \theta \gamma^2 = 1$) (where $\theta$ is a constant coefficient, and $\Sigma$ is a sum total over the unit time periods for which the mobile object supplies electricity). Thus, electricity is preferentially supplied in a unit time period in which the degree of tightness of electricity is higher at an electricity demander.

Figure 10A:
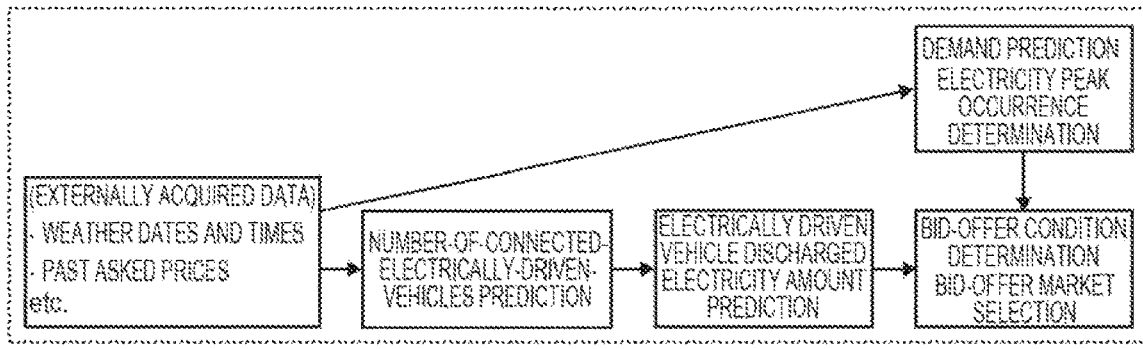
FIG. 10A shows, in a form of a block diagram, a configuration in which a modification is made such that the bid-offer condition determination apparatus for electricity demander according to the embodiment is provided with an number-of-connected-electrically-driven-vehicles prediction section that predicts the number of mobile objects (electrically driven vehicles) connected to chargers-dischargers under coverage of the electricity demander, and an electrically driven vehicle discharged electricity amount prediction section that predicts an amount of electricity that can be procured from mobile objects (electrically driven vehicles) at the chargers-dischargers, and a predicted value of an amount of electricity that can be procured from the mobile objects (electrically driven vehicles) is referred to when a bid-offer condition is determined, wherein only parts changed from the configuration of the bid-offer condition determination apparatus for electricity demander in FIG. 6 are depicted.

(b) Change in Configuration of Bid-Offer Condition Determination Apparatus for Electricity Demander As schematically shown in FIG. 10A, the bid-offer condition determination apparatus for electricity demander illustrated in FIG. 6 may be configured further to be able to: at a number-of-connected-electrically-driven-vehicles prediction section, predict the number of mobile objects such as electrically driven vehicles that can be connected to a charger-discharger facility of the electricity demander from the present into the future, by using information acquired by the externally acquired data collection section; and at an electrically driven vehicle discharged electricity amount prediction section, acquire a predicted value of an amount of electricity that can be procured from mobile objects such as electrically driven vehicles based on the predicted number. The number of mobile objects such as electrically driven vehicles that can be connected may be predicted according to an arbitrary algorithm, by referring to information such as climate information and dates and times, and by checking, for comparison, the number of mobile objects that gathered around the electricity demander in a similar situation in the past, or further the number of mobile objects that connected and supplied electricity to a charger-discharger facility of the electricity demander, and the like. The predicted value of the amount of electricity that can be procured from mobile objects such as electrically driven vehicles may be predicted according to an arbitrary algorithm, by referring to the predicted number of mobile objects such as electrically driven vehicles that can be connected, and by checking, for comparison, an amount of electricity that was able to be procured in a similar situation in the past, and the like. The predicted value of the amount of electricity that can be procured from mobile objects such as electrically driven vehicles may be referred to at the bid-offer condition determination section when a bid-offer condition is determined. For example, a configuration may be made such that a buy price to be bid on the direct transaction market is reduced when the predicted value of the amount of electricity that can be procured from mobile objects indicates a sufficient amount, compared to a predicted value of the demanded amount of electricity, and when the predicted value of the amount of electricity that can be procured from mobile objects are on the short side or the like, compared to a predicted value of the demanded amount of electricity, a buy price to be bid on the direct transaction market is set higher to incentivize mobile objects existing in relatively remote areas to supply electricity, so that electricity can be more reliably procured. In other words, by predicting an amount that is likely to be bought from mobile objects beforehand, a more adequate bid-offer condition can be set.

Figure 10B:
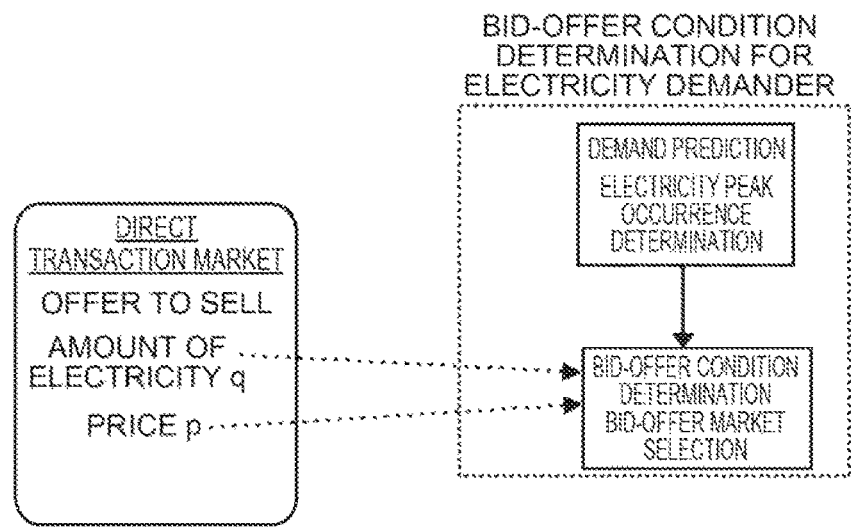
FIG. 10B shows, in a form of a block diagram, a configuration in which a modification is made such that the bid-offer condition determination apparatus for electricity demander according to the embodiment refers to a desired sell amount of electricity and a sell price in an offer placed by an electrically driven vehicle on the direct transaction market when a bid-offer condition is determined, wherein only parts changed from the configuration of the bid-offer condition determination apparatus for electricity demander in FIG. 6 are depicted.

Further, according to the bid-offer condition determination apparatus for electricity demander, as shown in FIG. 10B, the bid-offer condition determination section may be configured to: acquire information on sell amounts of electricity and sell prices offered by mobile objects on the direct transaction market; refer to such information; and determine a bid-offer condition. Specifically, processing may be performed in which a lower buy price is set as a larger number of sell amounts of electricity are offered on the direct transaction market, or the buy price is adjusted such as to be fair to sell prices offered on the direct transaction market. In other words, by predicting an amount that is likely to be bought from mobile objects beforehand, a more adequate bid-offer condition can be set.

Supplement Related to Configuration of Electricity Transaction System

As described above, according to the embodiments, at a mobile object, the apparatus is adopted that determines a bid-offer condition that can make a gain from an electricity transaction larger for the mobile object, and at an electricity demander, the apparatus is adopted that, when electricity demand is high, sets an adequate bid-offer condition and enables electricity procurement through the direct transaction market such that a maximum planned amount of electricity procured from the grid-electricity network can be restrained. Accordingly, a system in which P2P electricity transactions are conducted is configured to accept bids and offers according to conditions determined by the bid-offer condition determination apparatuses. Moreover, according to some of the embodiments, a configuration is provided in which a bid-offer condition is determined by using information on amounts of electricity and prices bid and offered on markets. Accordingly, to achieve such processing, the system is configured such that such bid-offer information can be provided from the system to the apparatus for mobile object or electricity demander.

Although the above description has been given in connection with the embodiments of the present disclosure, many modifications and changes can be made by those skilled in the art. It is obvious that an applicable embodiment of the present disclosure is not limited only to the embodiments illustrated above, and can be applied to various apparatuses without departing from the conception of the present disclosure.

What is claimed is:

1. A computer apparatus, associated with a mobile object, that determines a bid-offer condition for a transaction of selling and buying an amount of electricity on at least one electricity transaction market, comprising:
   a memory device storing program instructions;
   a computer processing device configured to execute the program instructions to perform operations comprising:
      determining an upper limit of a bid or offer amount of electricity in each of unit time periods, for a storage battery of the mobile object using a bid-offer electricity amount upper limit determination section of the computer processing device;
      predicting sell and buy prices for an amount of electricity in each of the unit time periods on each electricity transaction market using an electricity amount sell-buy price prediction section of the computer processing device;
      determining, for each of the unit time periods, an electricity transaction market, a sell or buy price, and an amount of electricity to be charged into or discharged from the storage battery of the mobile object in an optimal condition using a charge-discharge optimization section of the computer processing device, by detecting the optimal condition that makes a largest gain in terms of an index value, which represents a profit gained or a loss incurred from selling or buying of the amount of electricity by the mobile object on the electricity transaction market, within ranges of dischargeable and chargeable amounts of electricity of the storage battery of the mobile object over at least one of the unit time periods, based on the upper limit of the bid or offer amount of electricity obtained by the bid-offer electricity amount upper limit determination section, and predicted values of the sell and buy prices for the amount of electricity obtained by the electricity amount sell- buy price prediction section; and
      determining, as the bid-offer condition on the at least one electricity transaction market, for each of the unit time periods, whether to place an offer or a bid on the electricity transaction market determined by the charge-discharge optimization section, at the sell or buy price for the amount of electricity to be discharged or charged determined by the charge-discharge optimization section using a bid-offer condition determination section of the computer processing device
      wherein for the at least one electricity transaction market, a direct transaction market can be selected, on which a contract is executed for an electricity transaction in which the mobile object directly supplies electricity to an electricity demander, the electricity amount sell-buy price prediction section is configured to predict a buy price for the amount of electricity in each of the unit time periods to be presented by the electricity demander on the direct transaction market, as a predicted value of the sell and buy prices for the amount of electricity, and the bid-offer electricity amount upper limit determination section includes a section that predicts an amount of electricity demanded by the electricity demander over at least one of the unit time periods, the bid-offer electricity amount upper limit determination section is configured to determine the upper limit of the bid or offer amount of electricity in each of the unit time periods, based on a predicted value of the demanded amount of electricity and an amount of electricity transferable from the mobile object, and the bid-offer electricity amount upper limit determination section is configured to determine the amount of electricity transferable from the mobile object, based on: an amount of electricity obtained by subtracting an amount of electricity predicted to be consumed by the mobile object before electricity is supplied to the electricity demander from an amount of electricity stored in the storage battery of the mobile object; a predicted value of a duration for which the mobile object is stopped at the electricity demander; and an amount of electricity per unit time period dischargeable from the storage battery of the mobile object at the electricity demander.

2. The computer apparatus according to claim 1, wherein the bid-offer electricity amount upper limit determination section is configured to determine the upper limits of the bid or offer amount of electricity by distributing the amount of electricity transferable from the mobile object such that one of the upper limits of the bid or offer amount of electricity in a unit time period in which a predicted value of the amount of electricity demanded by the electricity demander is larger is higher than another one of the upper limits of the bid or offer amount of electricity in a unit time period in which a predicted value of the amount of electricity demanded by the electricity demander is smaller.

3. The computer apparatus according to claim 2, wherein:
a reference value is set that is to allow the electricity demander to conduct electricity procurement through the direct transaction market for the demanded amount of electricity; and the bid-offer electricity amount upper limit determination section includes a section that calculates a degree of tightness of electricity, which is an index value indicating an extent to which a predicted value of the amount of electricity demanded by the electricity demander exceeds the reference value in any one of the unit time periods, and the bid-offer electricity amount upper limit determination section is configured to set the one of the upper limits of the bid or offer amount of electricity to be higher according to a magnitude of the extent, indicated by the degree of tightness of electricity, to which the predicted value of the demanded amount of electricity exceeds the reference value.

4. The computer apparatus according to claim 3, wherein the bid-offer electricity amount upper limit determination section is configured to set the one of the upper limits of the bid or offer amount of electricity to be higher than an amount that is proportional to the extent, indicated by the degree of tightness of electricity, to which the predicted value of the demanded amount of electricity exceeds the reference value.

5. The computer apparatus according to claim 1, wherein:
the electricity amount sell-buy price prediction section is configured to predict each predicted value of the buy price for the amount of electricity to be presented by the electricity demander on the electricity transaction market, based on a buy price bid by the electricity demander on the electricity transaction market; and the bid-offer electricity amount upper limit determination section is configured to predict a predicted value of the amount of electricity demanded by the electricity demander in each of the unit time periods, based on a desired buy amount of electricity bid by the electricity demander on the electricity transaction market.

6. A computer apparatus, associated with an electricity demander, that determines a bid-offer condition for a transaction of selling and buying an amount of electricity on at least one electricity transaction market, comprising:
a memory device storing program instructions;
a computer processing device configured to execute the program instructions to perform operations comprising:
predicting an amount of electricity demanded by the electricity demander over at least one unit time period using a section of the computer processing deviced; and determining, as the bid-offer condition, to place a bid to buy an amount of electricity on a direct transaction market, on which a contract is executed for an electricity transaction in which a mobile object directly supplies electricity to the electricity demander, when a predicted value of the amount of electricity demanded by the electricity demander in each of the at least one unit time period exceeds a predetermined reference value, using a bid-offer condition determination section of the computer processing device wherein the bid-offer condition determination section is configured to set a buy price of electricity in the bid-offer condition to be higher when a predicted value of the demanded amount of electricity exceeds the predetermined reference value, than when a predicted value of the demanded amount of electricity falls below the predetermined reference value.

7. The computer apparatus according to claim 6, wherein the bid-offer condition determination section includes a section that predicts an amount of electricity procurable from a mobile object that is able to directly supply electricity at the electricity demander in the at least one unit time period, and the bid-offer condition determination section is configured to set the buy price of electricity in the bid-offer condition on the direct transaction market, based on a predicted value of the amount of electricity procurable from the mobile object.

8. An electricity transaction system configured to accept an offer or a bid for a transaction of selling and buying electricity from a mobile object and a bid to buy electricity from an electricity demander, and execute a contract for the transaction of selling and buying electricity, wherein the system is configured to accept, from the mobile object, the bid or offer according to a bid-offer condition determined by the computer apparatus according to claim 1 associated with the mobile object.

9. An electricity transaction system configured to accept an offer or a bid for a transaction of selling and buying electricity from a mobile object and a bid to buy electricity from an electricity demander, and execute a contract for the transaction of selling and buying electricity, wherein the system is configured to accept, from the mobile object, the bid or offer according to a bid-offer condition determined by the computer apparatus according to claim 1 for the mobile object, and the system is configured further to accept, from the electricity demander, the bid according to a bid-offer condition determined by a second computer apparatus associated with the electricity demander, wherein the second computer apparatus associated with the electricity demander is configured to determine a bid-offer condition for a transaction of selling and buying an amount of electricity on at least one electricity transaction market, and the second computer apparatus for the electricity demander comprises:
   a memory device storing program instructions; and
   a second computer processing device configured to execute the program instructions to perform operations comprising:
      predicting an amount of electricity demanded by the electricity demander over at least one unit time period using a section of the second computer processing device; and
      determining, as the bid-offer condition, to place a bid to buy an amount of electricity on a direct transaction market, on which a contract is executed for an electricity transaction in which a mobile object directly supplies electricity to the electricity demander, when a predicted value of the amount of electricity demanded by the electricity demander in each of the at least one unit time period exceeds a predetermined reference value, using a bid-offer condition determination section of the second computer processing device,
   wherein the bid-offer condition determination section is configured to set a buy price of electricity in the bid-offer condition to be higher when a predicted value of the demanded amount of electricity exceeds the predetermined reference value, than when a predicted value of the demanded amount of electricity falls below the predetermined reference value.

\* \* \* \* \*